(12) United States Patent
Ha et al.

(10) Patent No.: US 10,817,637 B2
(45) Date of Patent: Oct. 27, 2020

(54) SYSTEM AND METHOD OF DESIGNING INTEGRATED CIRCUIT BY CONSIDERING LOCAL LAYOUT EFFECT

(71) Applicant: Samsung Electronics Co., Ltd., Suwon-si (KR)

(72) Inventors: Naya Ha, Seoul (KR); Yong-Durk Kim, Hwaseong-si (KR); Bong-hyun Lee, Suwon-si (KR); Hyung-ock Kim, Seoul (KR); Kwang-ok Jeong, Hwaseong-si (KR); Jae-hoon Kim, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 405 days.

(21) Appl. No.: 15/643,472

(22) Filed: Jul. 7, 2017

(65) Prior Publication Data
US 2018/0032658 A1    Feb. 1, 2018

(30) Foreign Application Priority Data

Jul. 29, 2016    (KR) .................... 10-2016-0097538
Nov. 29, 2016    (KR) .................... 10-2016-0160781

(51) Int. Cl.
| | |
|---|---|
| *G06F 30/392* | (2020.01) |
| *G06F 30/394* | (2020.01) |
| *G06F 30/398* | (2020.01) |
| G06F 119/06 | (2020.01) |
| G06F 119/10 | (2020.01) |
| G06F 119/12 | (2020.01) |
| G06F 119/18 | (2020.01) |

(52) U.S. Cl.
CPC .......... *G06F 30/392* (2020.01); *G06F 30/394* (2020.01); *G06F 30/398* (2020.01); *G06F 2119/06* (2020.01); *G06F 2119/10* (2020.01); *G06F 2119/12* (2020.01); *G06F 2119/18* (2020.01)

(58) Field of Classification Search
USPC ......................................................... 716/52
See application file for complete search history.

(56) References Cited

U.S. PATENT DOCUMENTS

| | | |
|---|---|---|
| 7,092,838 B1 | 8/2006 | Srinivas et al. |
| 7,581,201 B2 | 8/2009 | Kazda et al. |
| 7,634,743 B1 | 12/2009 | Ginetti |
| 8,037,433 B2 | 10/2011 | Chidambarrao et al. |
| 8,494,670 B2 | 7/2013 | McConaghy et al. |
| 8,621,409 B2 | 12/2013 | Lee et al. |

(Continued)

FOREIGN PATENT DOCUMENTS

| | | |
|---|---|---|
| JP | 2013-109498 A | 6/2013 |
| KR | 10-2016-0023538 A | 3/2016 |
| KR | 10-2016-0047380 A | 5/2016 |

*Primary Examiner* — Eric D Lee
(74) *Attorney, Agent, or Firm* — Muir Patent Law, PLLC

(57) ABSTRACT

A system and method of designing an integrated circuit (IC) by considering a local layout effect are provided. The method of designing an IC may place instances of pre-placement cells so as to decrease occurrence of a local layout effect (LLE) causing structure. The method may extract a context of an instance from a peripheral layout of each of the placed instances to estimate an LLE of the instance, thereby analyzing a performance of the IC.

16 Claims, 19 Drawing Sheets

(56) References Cited

U.S. PATENT DOCUMENTS

| | | |
|---|---|---|
| 8,701,055 B1 | 4/2014 | Lee et al. |
| 8,732,640 B1 | 5/2014 | Krishnan et al. |
| 8,769,456 B1 | 7/2014 | Krishnan et al. |
| 9,038,010 B2 | 5/2015 | Chuang et al. |
| 9,064,063 B1 | 6/2015 | Yu et al. |
| 9,064,072 B2 | 6/2015 | Brown |
| 9,245,078 B2 | 1/2016 | Huang et al. |
| 9,330,219 B2 | 5/2016 | Yang et al. |
| 9,342,647 B2 | 5/2016 | Chen et al. |
| 9,460,259 B2 | 10/2016 | Baek et al. |
| 2007/0234266 A1 | 10/2007 | Chen et al. |
| 2012/0286331 A1* | 11/2012 | Aton ................. G06F 30/39 257/202 |
| 2015/0317427 A1 | 11/2015 | Chai et al. |
| 2015/0356232 A1 | 12/2015 | Bomholt et al. |
| 2016/0117431 A1 | 4/2016 | Kim et al. |
| 2016/0140279 A1 | 5/2016 | Zhu et al. |
| 2016/0378888 A1* | 12/2016 | Chidambarrao ...... G06F 30/367 716/135 |

\* cited by examiner

FIG. 5
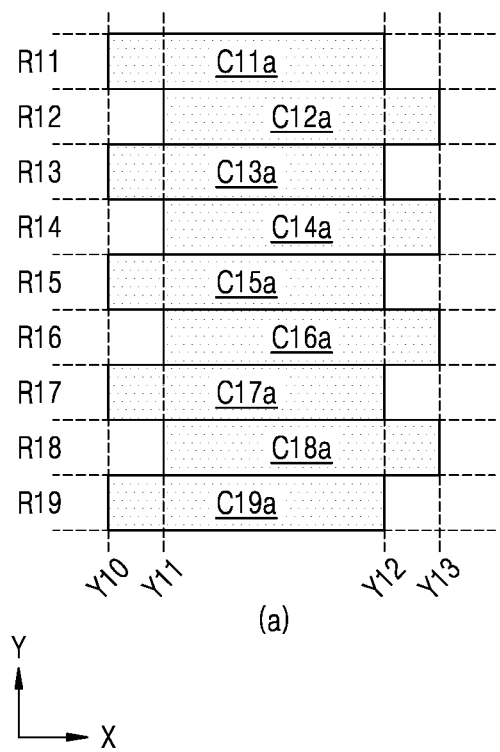
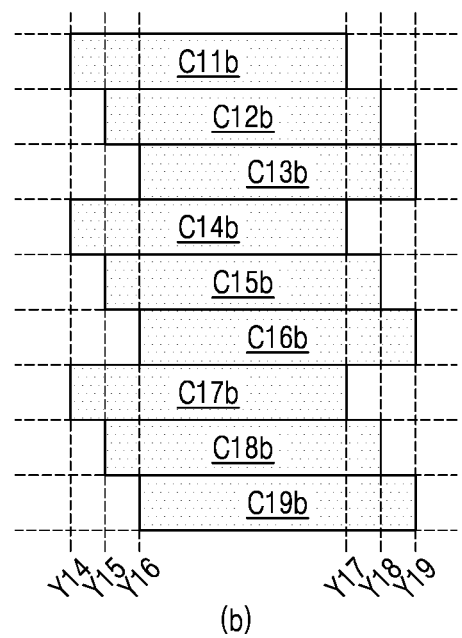

FIG. 6
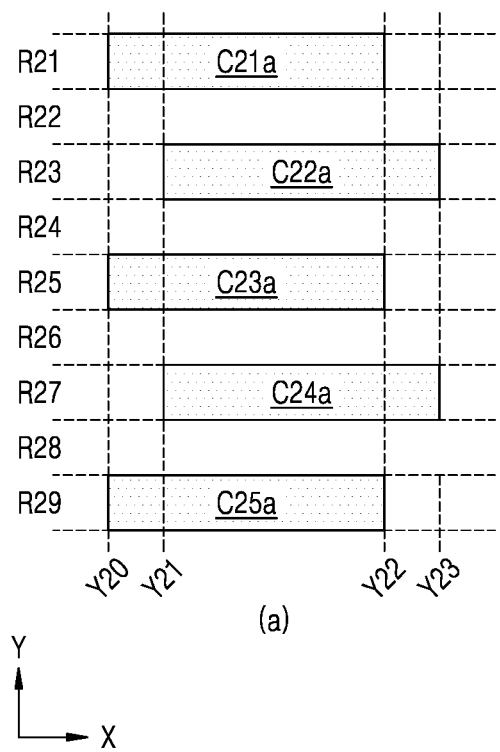
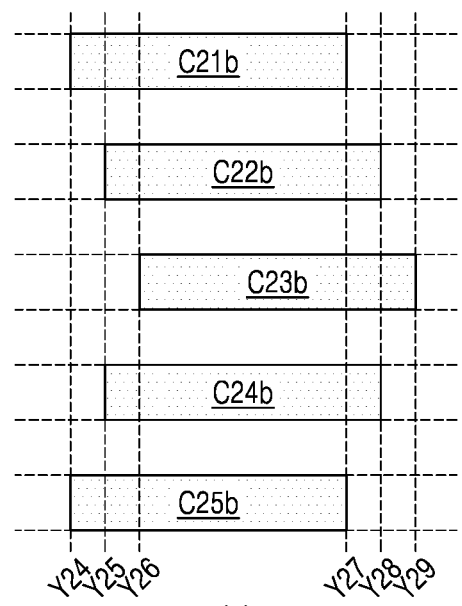

FIG. 10A
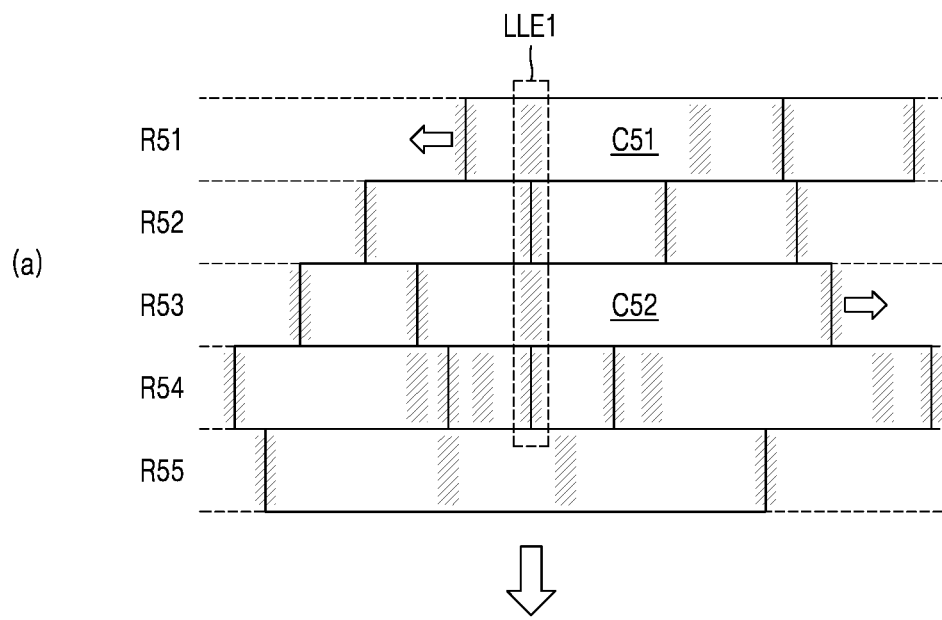
(a)
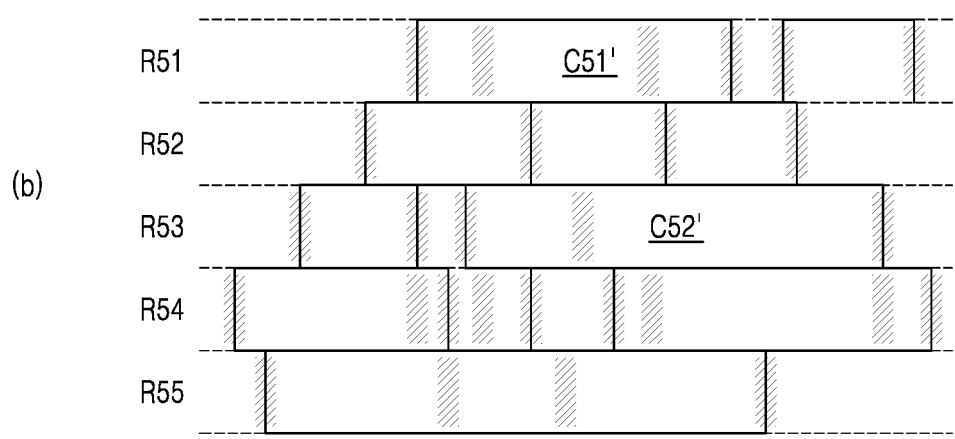
(b)
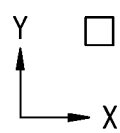
☐ : INSTANCE OF STANDARD CELL   ▨ : FRONT-END-LAYER

| | INV | | | |
|---|---|---|---|---|
| X / Y | 2x | 8x | 16x | 32x |
| 1y | REF | −1.78% | −2.22% | −2.46% |
| 3y | −0.54% | −3.06% | −3.64% | −4.05% |
| 5y | −1.84% | −7.37% | −8.45% | −9.09% |
| 7y | −3.09% | −9.56% | −11.09% | −11.56% |
| 11y | −4.01% | −11.33% | −12.84% | −13.68% |

SYSTEM AND METHOD OF DESIGNING INTEGRATED CIRCUIT BY CONSIDERING LOCAL LAYOUT EFFECT

CROSS-REFERENCE TO RELATED APPLICATIONS

This application claims the benefits of Korean Patent Application Nos. 10-2016-0097538, filed on Jul. 29, 2016, and 10-2016-0160781, filed on Nov. 29, 2016, in the Korean Intellectual Property Office, the disclosures of which are incorporated herein in their entireties by reference.

BACKGROUND

The exemplary embodiments of the herein described subject matter relate to an integrated circuit (IC), and more particularly, to a system and method of designing an IC by considering a local layout effect.

ICs for processing digital signals may be designed based on standard cells. ICs may each include instances of the standard cells, and instances corresponding to one standard cell may have the same structure, namely, the same layout. Instances may be placed in order for an IC to realize a desired function, and interconnections that electrically connect the instances may be generated, thereby generating a layout of the IC.

As a semiconductor manufacturing process is miniaturized, a standard cell including patterns provided in a plurality of arrays may include patterns having a reduced size, and moreover, a size of the standard cell may decrease. Therefore, an influence of a peripheral structure (i.e., layout) may increase on an instance of a standard cell included in an IC, and the influence of the peripheral layout may be referred to as a local layout effect (LLE) or a layout dependent effect (LDE).

SUMMARY

The herein described exemplary embodiments describe a method of designing an IC by considering an LLE, and moreover, provides a system and a method to manufacture an IC having a layout with decreased LLE. Methods may comprise generating a layout of an IC so as to decrease LLEs, and/or reflect the LLEs in the IC to analyze a performance of the IC.

According to an exemplary embodiment, an integrated circuit (IC) is designed using a standard cell library, including instances of standard cells, a pre-placer configured to place first instances of pre-placement cells to decrease occurrence of a local layout effect (LLE) causing structure caused by placement of second instances of logic cells, an instance placer configured to place the second instances in an area where the first instances are not placed, and a router configured to generate layout data of the IC by routing connections of the placed first and second instances.

According to another exemplary embodiment, an integrated circuit (IC) is manufactured including instances of standard cells, including placing first instances of pre-placement cells to decrease occurrence of a local layout effect (LLE) causing structures caused by placement of second instances of logic cells, placing the second instances in an area where the first instances are not placed, and generating layout data of the IC by routing connections of the first and second instances.

According to another exemplary embodiment, an instance characterizer is configured to refer to local layout effect (LLE) data including information about a physical characteristic of a standard cell dependent on a peripheral layout and calculate a physical characteristic of an instance placed in the IC based on context data including a context of the placed instance, based on context data, including a context of the placed instance, of a peripheral layout of the placed instance and a performance analyzer configured to generate result data including performance information about the IC, based on the calculated physical characteristic of the placed instance.

According to another exemplary embodiment, methods of manufacturing an IC may include use of LLE data and context data. The local layout effect (LLE) data may include information about a physical characteristic of a standard cell that is dependent on a peripheral layout, and the context data may include a context of the placed instance with respect to a peripheral layout of an instance placed in the IC. A physical characteristic of the placed instance may be estimated based on the LLE data and the context data to generate performance result information about the IC.

BRIEF DESCRIPTION OF THE DRAWINGS

Exemplary embodiments will be more clearly understood from the following detailed description taken in conjunction with the accompanying drawings in which:

FIGS. 5 to 8 are diagrams illustrating exemplary operations of a pre-placer of FIG. 4 according to exemplary embodiments;

FIGS. 10A and 10B are diagrams illustrating exemplary operations of an instance shifter of FIG. 9A or 9B according to exemplary embodiments;

DETAILED DESCRIPTION

Figure 1:
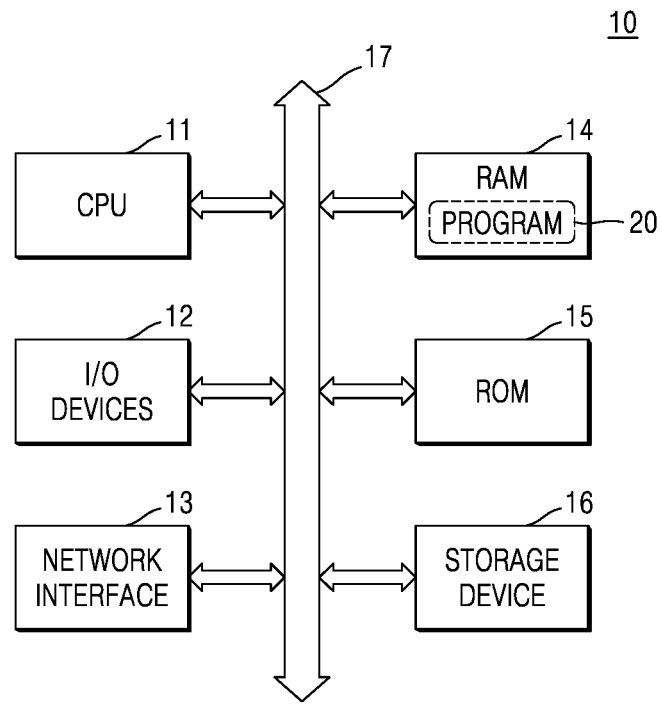
FIG. 1 illustrates a block diagram of a computing system including a memory storing a program, according to an exemplary embodiment.

The present disclosure now will be described more fully hereinafter with reference to the accompanying drawings, in which various exemplary embodiments are shown. The invention may, however, be embodied in many different forms and should not be construed as limited to the exemplary embodiments set forth herein. These example exemplary embodiments are just that—examples—and many embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

Although the figures described herein may be referred to using language such as "one embodiment," or "certain embodiments," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Each block, unit and/or module may correspond to a separate segment or segments of software (e.g., a subroutine) which configure the computer, or may correspond to segment(s) of software that are shared with one or more other blocks, units and/or modules. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 illustrates a block diagram of a computing system 10 including a memory storing a program, according to an exemplary embodiment. An operation of designing an IC according to an exemplary embodiment may be performed by the computing system 10.

The computing system 10 may be a fixed computing system such as a desktop computer, a workstation, or a server, or may be a portable computing system such as a laptop computer. As illustrated in FIG. 1, the computing system 10 may include a central processing unit (CPU) 11, input/output (I/O) devices 12, a network interface 13, random access memory (RAM) 14, read-only memory (ROM) 15, and a storage device 16. The CPU 11, the I/O devices 12, the network interface 13, the RAM 14, the ROM 15, and the storage device 16 may be connected to a bus 17 and may communicate with each other through the bus 17.

The CPU 11 may be referred to as a processing unit and may include a core for executing an arbitrary instruction set (for example, intel architecture-32 (IA-32), 64 bit extension IA-32, x86-64, PowerPC, Sparc, MIPS, ARM, IA-64, etc.) like a micro-processor, an application processor (AP), a digital signal processor (DSP), a graphics processing unit (GPU), etc. For example, the CPU 11 may access a memory (i.e., the RAM 14 or the ROM 15) through the bus 17 and may execute instructions stored in the RAM 14 or the ROM 15. As illustrated in FIG. 1, the RAM 14 may store a program 20 according to an exemplary embodiment or at least some elements of the program 20, and the program 20 may allow the CPU 11 to perform an operation of designing an IC. That is, the program 20 may include a plurality of instructions executable by the CPU 11, and the plurality of instructions included in the program 20 may allow the CPU 11 to perform operations of designing the IC according to an exemplary embodiment.

Data stored in the storage device 16 may not be lost even when power supplied to the computing system 10 is cut off. For example, the storage device 16 may include a non-volatile memory, such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like, and may include a storage medium such as an optical disk, a magnetic disk, or the like. Also, the storage device 16 may be detachably attached to the computing system 10. The storage device 16 may store the program 20 according to an exemplary embodiment. The program 20 or at least some elements of the program 20 may be loaded from the storage device 16 to the RAM 14 before being executed by the CPU 11. The storage device 16 may store a file written in a program language, and the program 20 generated by a compiler or the like or at least some elements of the program 20 may be loaded to the RAM 14.

The storage device 16 may store data, which is to be processed by the CPU 11, or data obtained through processing by the CPU 11. The CPU 11 may process the data stored in the storage device 16 to generate new data, based on the program 20 and may store the generated data in the storage device 16. For example, the storage device 16 may store input data D010 of FIG. 3 obtained through processing by the program 20 and may store layout data D100 and/or result data D200 of FIG. 3 generated by the program 20.

The I/O devices 12 may include an input device, such as a keyboard, a pointing device, or the like, and may include an output device such as a display device, a printer, or the like. For example, a user may trigger, through the I/O devices 12, execution of the program 20 by the CPU 11 or may input the input data D010 of FIG. 3, and may check the layout data D100 of FIG. 3, the result data D200 of FIG. 3, an error message, and/or the like.

The network interface 13 may provide access to a network outside the computing system 10. For example, the network may include a plurality of computing systems and communication links, and the communication links may include wired links, optical links, wireless links, or arbitrary other type links. The input data D010 of FIG. 3 may be provided to the computing system 10 through the network interface 13, and the layout data D100 and/or the result data D200 may be provided to another computing system through the network interface 13.

Figure 2:
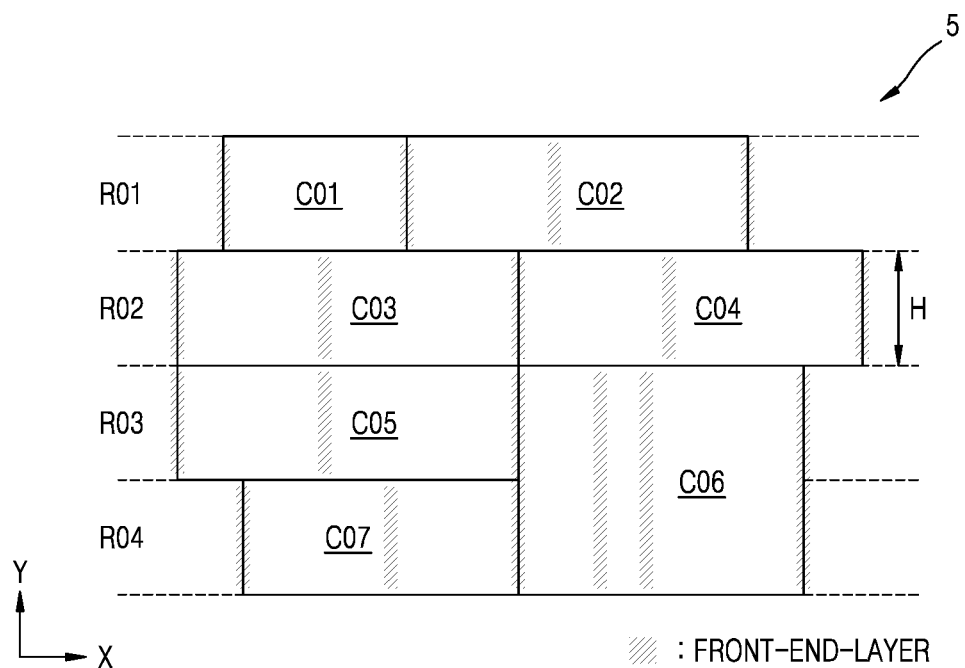
FIG. 2 illustrates a schematic plan view of an IC according to an exemplary embodiment.

FIG. 2 illustrates a schematic plan view of an IC 5 according to an exemplary embodiment. In FIG. 2, for convenience of description, each of the elements included in the IC 5 may not match a scale and may be exaggerated or reduced.

As shown in FIG. 2, the IC 5 may include instances C01 to C07 of standard cells. In this example, instances (for example, C02 to C05) correspond to the same standard cell and have the same layout. Instances corresponding to different standard cells (e.g., C01, C06 and C07) may respectively have different layouts. The instances C01 to C07 may be aligned and placed in a plurality of rows R01 to R04. The instances C01 to C07 may have a length H (i.e., a height) which is prescribed in a direction (i.e., a Y direction) vertical to the plurality of rows R01 to R04 extending in an X direction, and may have the same or different lengths (i.e., widths) in a direction (i.e., the X direction) parallel to the plurality of rows R01 to R04. Each of the plurality of rows R01 to R04 where the instances C01 to C06 are aligned may be set to have a height matching a minimum height of a standard cell. A standard cell corresponding to instances having a height matching a height H of a row like instances C01 to C05 and C07 of FIG. 2 may be referred to as a single height cell, and a standard cell corresponding to instances having a height matching a multiple of the height H of the row, like the instance C06 of FIG. 2, may be referred to as a multi-height cell.

Based on physical characteristics, such as a function, timing characteristic, etc., of a standard cell, a standard cell which is added to an IC design may be selected from a cell library (for example, D310 of FIG. 3) that includes information about a plurality of standard cells, and a layout of the IC 5 may be generated by arranging an instance of the selected standard cell. The instance as placed in the IC 5 may have a physical characteristic that is different from an intrinsic physical characteristic of the standard cell, based on layouts of instances adjacent to the instance. For example, a threshold voltage Vth and a saturation current Idsat of a transistor included in the instance may vary according to the adjacent layouts to the instance, and thus, the physical characteristics of the instance included in the IC 5 may differ from intrinsic physical characteristics of a standard cell as defined in the cell library. In this manner, the influence of a layouts peripheral to an instance may be referred to as a local layout effect (LLE). Accurately checking an LLE of an instance is difficult until the arrangement of the instance and layouts peripheral to the instance are determined.

A physical characteristic (for example, a threshold voltage Vth, a saturation current Idsat, etc.) of a transistor may be changed by a pattern of a front-end-layer (or a front-end-of-layer) formed near the transistor. For example, the physical characteristic of the transistor may be changed by a length of a pattern of a front-end-layer aligned in the Y direction and a distance between patterns of the front-end-layer which are spaced apart from each other in the Y direction. The front-end-layer may be a layer of material in the manufactured IC forming and/or associated with forming of the transistor and may denote a layer formed by a front-end-of-line where elements such as a transistor, a capacitor, and a resistor are manufactured in a semiconductor manufacturing process. For example, as illustrated in FIG. 2, the standard cells corresponding to instances C01 to C07 may include insulative and/or conductive patterns of a front-end-layer provided in an edge or an internal portion.

According to an exemplary embodiment, an IC designing method capable of being performed by the computing system 10 of FIG. 1 may consider an LLE, based on a front-end-layer. For example, as described below with reference to FIGS. 4 to 10, instances may be arranged so as to decrease occurrence of an LLE by the front-end-layer, and thus, the LLE and a performance change of an IC caused by the LLE may be removed or reduced. Also, as described below with reference to FIGS. 11 to 16, an actual physical characteristic of an instance may be calculated based on a front-end-layer near the instance, and thus, an actual performance of an IC may be analyzed by reflecting an LLE, and the IC may be optimally designed to remove or reduce an undesired performance margin.

Figure 3:
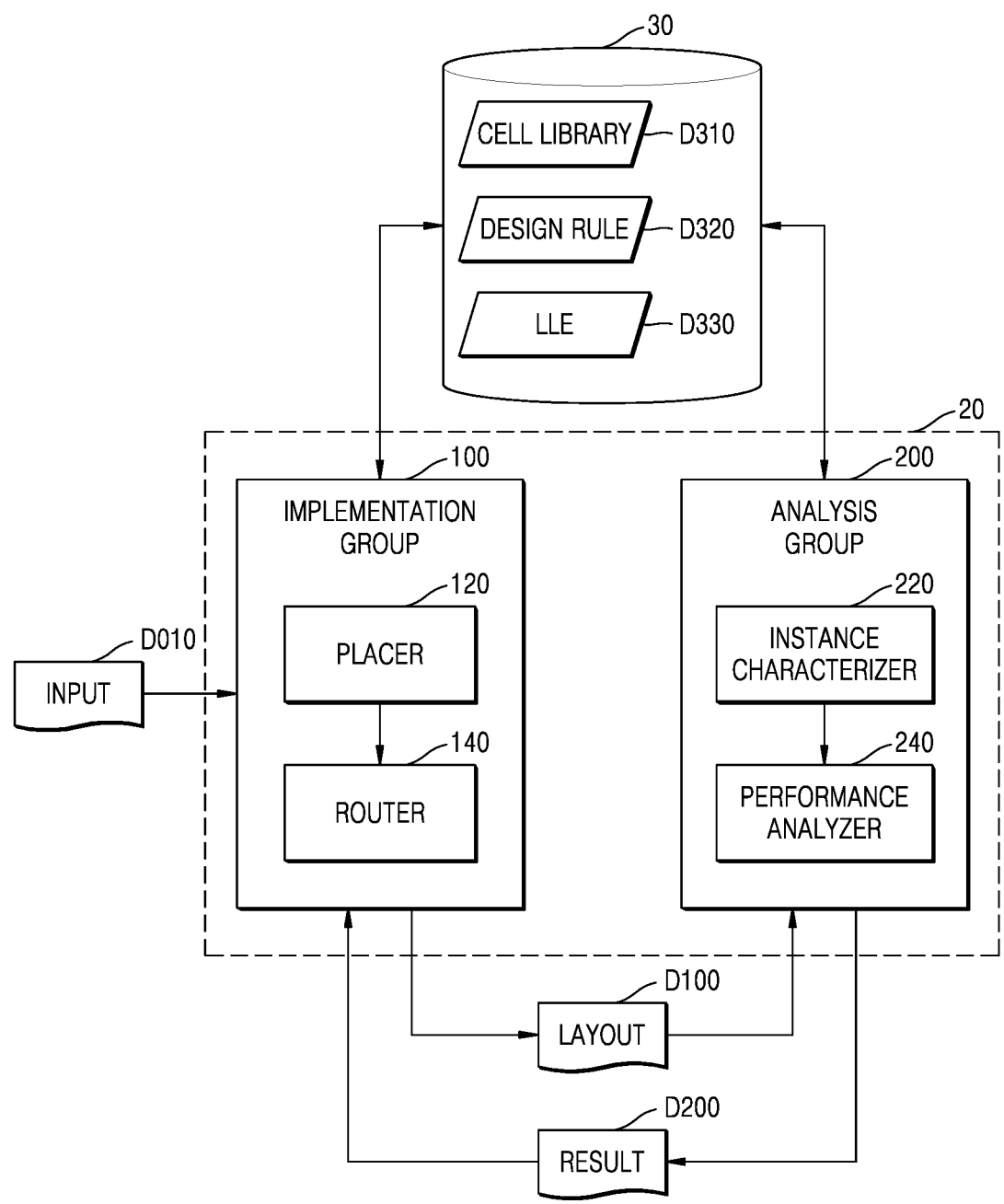
FIG. 3 illustrates a block diagram of a program of FIG. 1 according to an exemplary embodiment.

FIG. 3 illustrates a block diagram of the program 20 of FIG. 1 according to an exemplary embodiment. As described above with reference to FIG. 1, the program 20 may include a plurality of instructions that may allow the CPU 11 to perform an operation of designing an IC according to an exemplary embodiment. All of elements of the program 20 illustrated in FIG. 3 may be stored in the RAM 14 of FIG. 1, or at least some of the elements may be stored in the RAM 14 of FIG. 1 and the other some elements may be stored in the ROM 15 or the storage device 16 of FIG. 1.

As shown in FIG. 3, the program 20 may include an implementation group 100 and an analysis group 200, the implementation group 100 may include a plurality of procedures 120 and 140, and the analysis group 200 may include a plurality of procedures 220 and 240. Each of the procedures may denote a series of instructions for performing a certain task. A procedure may be referred to as a function, a routine, a subroutine, or a subprogram. Each of the procedures may process data (for example, D010) provided from the outside and/or data (for example, D100) generated by another procedure. The CPU 11 of FIG. 1 which performs an operation by executing a procedure (for example, 120, 140, 220, or 240) may be expressed as the procedure (for example, 120, 140, 220, or 240) in performing the operation.

A cell library D310, a design rule D320, and LLE data D330 may be stored in a storage medium 30 and, for example, the storage medium 30 may be the storage device 16 of FIG. 1. The cell library D310 may include at least one of piece of information (for example, function information, timing information, layout information, and power information) about physical characteristics of a plurality of standard cells. The design rule D320 may include rules which a layout of an IC observes, in order for the IC to be manufactured by a semiconductor process and/or in order to prevent performance of the IC from being reduced. Also, described below, the design rule D320 may further include information for detecting a structure causing an LLE. The LLE data D330 may include information about a physical characteristic change of a standard cell caused by the LLE. As described below with reference to FIGS. 12 to 14, the LLE data D330 may be generated by an LLE data generator 300 and may be prepared before the implementation group 100 and the analysis group 200 of FIG. 3 are executed.

The implementation group 100 may refer to pieces of data D310, D320, and D330 stored in the storage medium 30 and may generate layout data D100 from input data D010. The input data D010 may be data that defines an IC, and for example, may include a netlist which includes instances of standard cells and information about electrical connection relationships between the instances. Also, the input data D010 may further include information (for example, a timing condition, a power condition, an area condition, etc.) about a requirement of the IC. The implementation group 100 may generate the layout data D100, including physical information about a layout of the IC, from the input data D010 defining the IC, based on the pieces of data D310, D320, and D330 stored in the storage medium 30.

Moreover, the implementation group 100 may access the result data D200 which includes information about performance of the IC and is generated based on the layout data D100 by the analysis group 200. The implementation group 100 may change the layout of the IC according to whether a performance of the IC based on the layout data D100 satisfies the requirement of the IC included in the input data D010, based on the result data D200 and may generate new layout data D100 representing the changed layout. For example, the result data D200 may include a performance reduction or a performance margin of the IC based on an LLE, and the implementation group 100 may generate the new layout data D100 representing a layout of an optimally designed IC, based on the result data D200.

A placer 120 of the implementation group 100 may place instances defined in the input data D010 with reference to the cell library D310. The placer 120 may obtain layouts of the instances defined in the input data D010 with reference to the cell library D310 and may place instances (i.e., layouts of the instances), based on information about the requirement of the IC included in the input data D010 and the design rule D320. As described below, according to an exemplary embodiment, the placer 120 may place instances so as to decrease occurrence of a structure causing an LLE. Details of the placer 120 will be described below with reference to FIGS. 4 to 8.

A router 140 may generate interconnections that electrically connect the instances placed by the placer 120. For example, the router 140 may generate an interconnection which includes a pattern and/or a via formed in a wiring layer, based on a routing source, namely, a plurality of wiring layers and vias. The router 140 may generate the interconnections, based on information about a connection relationship of the instances defined in the input data D010 and the design rule D320. Also, the router 140 may generate the interconnections, based on the information about the requirement of the IC included in the input data D010.

The analysis group 200 may refer to the pieces of data D310, D320, and D330 stored in the storage medium 30 and may generate the result data D200 from the layout data D100. The layout data D100 may include physical information about the layout of the IC, and for example, may include data having a GDSII format. Although it is illustrated in FIG. 3 that the analysis group 200 accesses the layout data D100 generated by the implementation group 100, the layout data D100 may be generated by a computing system different from a computing system where the analysis groups is performed, and may be provided to the analysis group 200. The analysis group 200 may analyze the performance of the IC, based on the layout data D100 and may generate the result data D200 including information about the performance of the IC. As described below, the analysis group 200 may estimate an LLE which occurs in the layout of the IC, and thus, the actual performance of the IC may be reflected in the result data D200.

An instance characterizer 220 of the analysis group 200 may calculate a physical characteristic of an instance included in the layout data D100 with reference to the LLE data D330. That is, the instance characterizer 220 may estimate a peripheral layout of the instance, namely, an LLE affecting the instance in context, thereby calculating the physical characteristic of the instance. For example, even in instances of the same standard cells, physical characteristics of the instances estimated by the instance characterizer 220 may differ. As described below with reference to FIGS. 15 and 16, the instance characterizer 220 may calculate the physical characteristic of the instance, based on a pattern of a front-end-layer included in the instance and a pattern of a front-end-layer formed in a peripheral layout.

A performance analyzer 240 may analyze the performance of the IC, based on the physical characteristic of the instance extracted by the instance characterizer 220. For example, the performance analyzer 240 may analyze a timing characteristic, a power characteristic, a noise characteristic, etc. of the IC. Also, the performance analyzer 240 may generate the result data D200 including a result obtained by determining whether the performance of the IC satisfies the requirement, based on the information about the requirement of the IC included in the input data D010.

Figure 4:
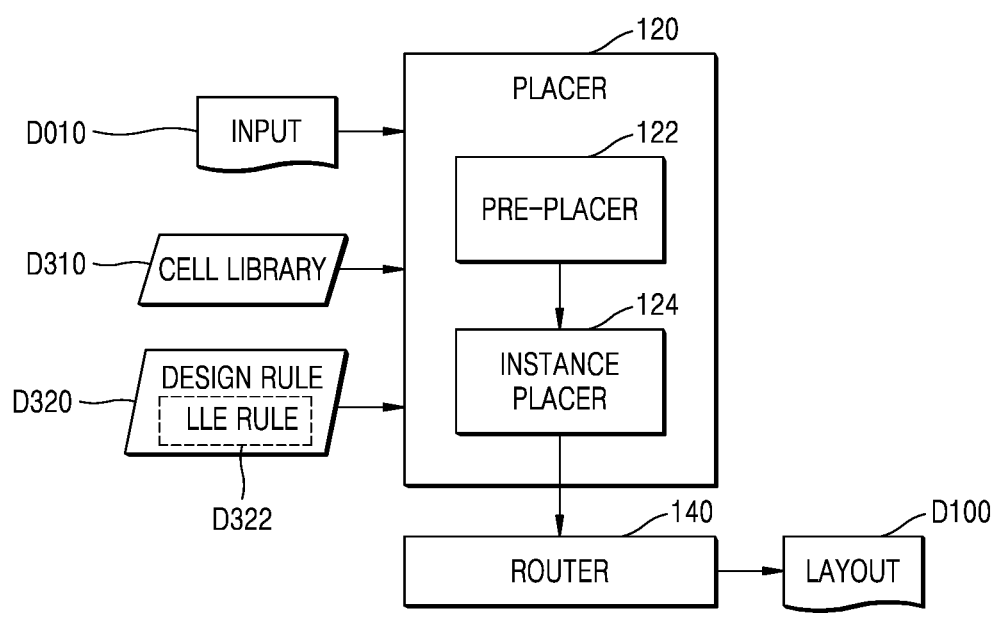
FIG. 4 illustrates a block diagram of a placer of FIG. 3 according to an exemplary embodiment.

FIG. 4 illustrates a block diagram of the placer 120 of FIG. 3 according to an exemplary embodiment. As described below with reference to FIG. 3, the placer 120 may place the instances defined in the input data D010. As illustrated in FIG. 4, the placer 120 may include a pre-placer 122 and an instance placer 124 and may access the input data D010, the cell library D310, and the design rule D320.

The pre-placer 122 may place instances of pre-placement cells. Each of the pre-placement cells may correspond to instances (referred to as first instances) which are placed before instances (referred to as second instances) of logic cells included in an IC are placed, and as a non-limiting example, may be a well-edge cell, a well-bias cell, a decap cell, or the like. The cell library D310 may include information about each of the pre-placement cells. The input data D010 may define some of instances of each of the pre-placement cells, and the pre-placer 122 may generate and place the instances of each of the pre-placement cells with reference to the cell library D310, based on the design rule D320.

The pre-placer 122 may place the first instances (i.e., instances of the pre-placement cells) so as to decrease occurrence of an LLE causing structure caused by placement of the second instances (i.e., instances of the logic cells). As illustrated in FIG. 4, the design rule D320 may include an LLE rule D322, and the LLE rule D322 may include information about the LLE causing structure. For example, the LLE rule D322 may include information defining a structure where patterns formed in a front-end-layer are aligned, and as described below with reference to FIGS. 5 to 8, the pre-placer 122 may place the first instances so as to decrease patterns of a front-end-layer included in the second instances being aligned, based on the LLE rule D322. Also, the LLE rule D322 may include information about an opposite length and/or an interval between adjacent patterns formed in the front-end-layer.

The instance placer 124 may place the second instances in an area where the first instances are not placed. The area where the second instances are placed may be limited by the first instances placed by the pre-placer 122, and thus, an LLE causing structure provided by the second instances may be reduced or removed. Therefore, the second instances may have physical characteristics close to an intrinsic physical characteristic of a standard cell defined in the cell library D310, and a difference between the physical characteristics of the second instances which have been placed and the physical characteristics of the second instances which are predicted in generating (for example, logical combining) the input data D010 may be reduced. When an LLE does not occur in the standard cell or an average LLE occurs in the standard cell, the cell library D310 may include information defining a physical characteristic of the standard cell, and the input data D010 may be generated based on the cell library D310. As a result, a difference between a performance of an IC based on the layout data D100 and a performance of the IC which is predicted in generating the input data D010 may be reduced, and thus, the IC may be optimally designed in generating the input data D010.

FIGS. 5 to 8 are diagrams illustrating exemplary operations of the pre-placer 122 of FIG. 4 according to exemplary embodiments. As described below with reference to FIG. 4, the pre-placer 122 may place first instances of a pre-placement cell so as to decrease an LLE causing structure based on placement of second instances. FIGS. 5 to 8 illustrate examples of instances placed by the pre-placer 122, and it may be understood that an operation of the pre-placer 122 is not limited to the examples illustrated in FIGS. 5 to 8. FIGS. 5 to 8 as will be described with reference to FIG. 4.

In the examples of FIGS. 5 to 8, an LLE rule 322 of FIG. 4 is assumed as including information defining a structure, where patterns of a front-end-layer are aligned, as an LLE causing structure, and at least some of the second instances are assumed as including patterns of front-end-layers formed in opposite edges. Therefore, the pre-placer 122 may place the first instances so that edges of an area where the second instances are placed are not aligned in a series of rows. Thus, the pre-placer 122 may appropriately place the first instances to allow the edges of the area, where the second instances are placed, not to be aligned in the plurality of rows, thereby decreasing edges of the second instances being aligned. As a result, patterns of front-end-layers formed in the edges of the second instances being aligned are reduced.

As shown in FIGS. 5 and 6, according to an exemplary embodiment, the pre-placer 122 may place the first instances so that edges of first instances closest to each other are not aligned in a direction vertical to a plurality of rows (for example, R11 to R19 of FIG. 5). For example, as illustrated in FIG. 5, the pre-placer 122 may place the first instances so that edges of first instances placed in rows adjacent to each other are not aligned. Also, as illustrated in FIG. 6, the pre-placer 122 may place the first instances so that edges of first instances placed in odd rows (or even rows unlike the illustration of FIG. 6) are not aligned (due to the design rule of FIG. 4).

As shown in FIG. 5, section (a), the pre-placer 122 may place first instances C11a to C19a so that left edges and right edges of the first instances C11a, C13a, C15a, C17a, and C19a placed in odd rows R11, R13, R15, R17, and R19 are respectively aligned in Y10 and Y12, and left edges and right edges of the first instances C12a, C14a, C16a, and C18a placed in even rows R12, R14, R16, and R18 are respectively aligned in Y11 and Y13. Similarly, as shown in FIG. 5, section (b), the pre-placer 122 may place the first instances C11b to C19b so that left edges of first instances (for example, C11b to C13b) sequentially placed in a series of rows (for example, R11 to R13) are respectively aligned in Y14, Y15, and Y16, and right edges are respectively aligned in Y17, Y18, and Y19.

As shown in FIG. 6, section (a), the pre-placer 122 may place first instances C21a to C25a so that left edges of the first instances (for example, C21a and C22a) sequentially placed in odd rows (for example, R21 and R23) are respectively aligned in Y20 and Y21, and right edges are respectively aligned in Y22 and Y23. Similarly, as shown in FIG. 6, section (b), the pre-placer 122 may place first instances C21b to C25b so that left edges of the first instances C21b to C25b sequentially placed in odd rows R21, R23, R25, R27, and R29 are respectively aligned in Y24, Y25, Y26, Y25, and Y24, and right edges are respectively aligned in Y27, Y28, Y29, Y28, and Y27.

Figure 7:
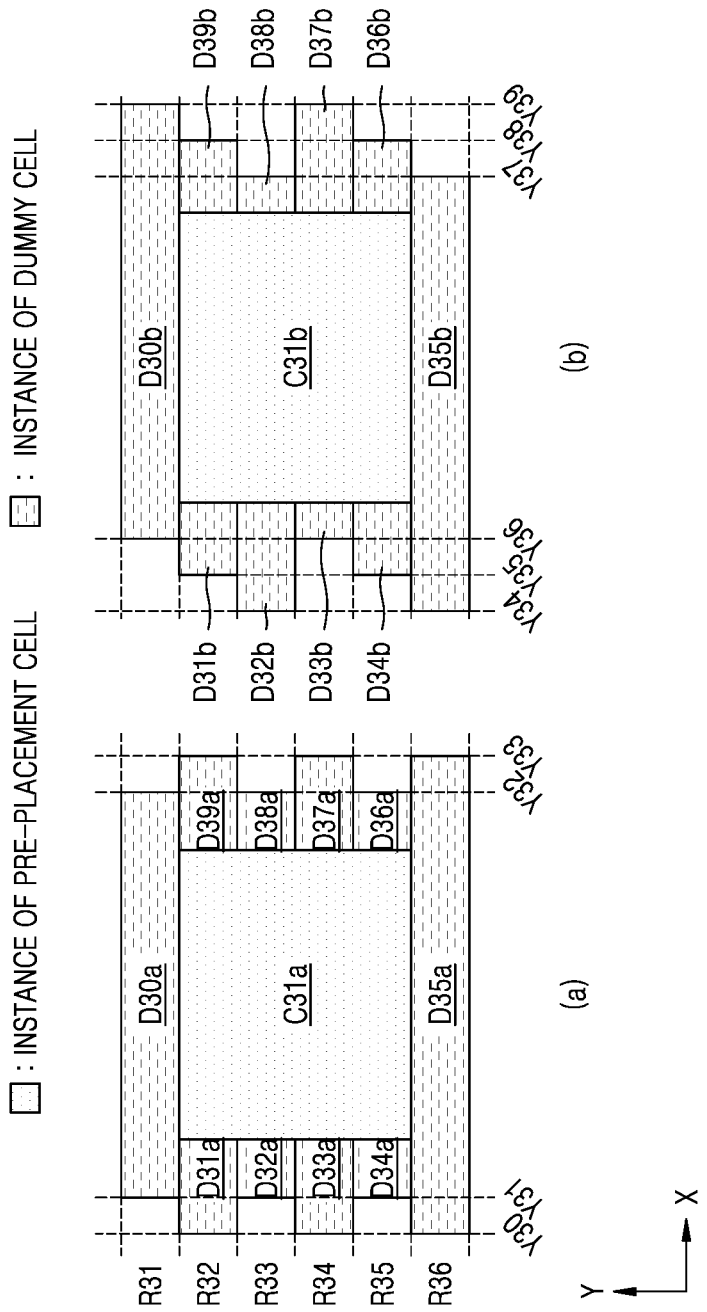
Figure 8:
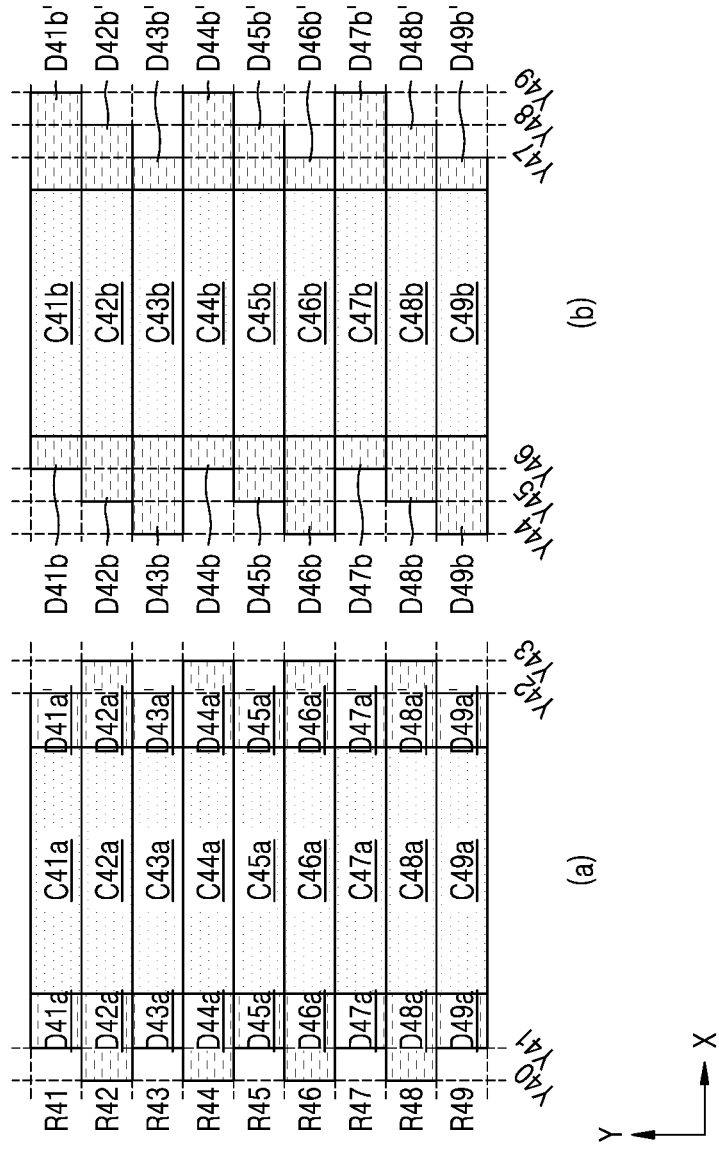

As shown in FIGS. 7 and 8, the pre-placer 122 may place instances of dummy cells to be adjacent to first instances, in order to decrease occurrence of an LLE causing structure based on placement of second instances. Each of the dummy cells may be a cell irrelevant to a function of an IC and may include a pre-placement cell or a filler cell. The cell library D310 of FIG. 4 may include information about a dummy cell, and the pre-placer 122 may place the instances of the dummy cells with reference to the cell library D310.

The pre-placer 122 may place instances of different dummy cells (for example, dummy cells having different widths) to be adjacent to an edge of at least one first instance having an edge vertical to a series of rows. For example, as illustrated in FIG. 7, a pre-placement cell may be a multi-height cell (i.e., a 4x multi-height cell) corresponding to a height of four rows, and the pre-placer 122 may alternately place two or more dummy cells having different widths to be adjacent to an edge of an instance of the pre-placement cell.

As shown in FIG. 7, section (a), a first instance C31a of the pre-placement cell which is the 4x multi-height cell may be placed by the pre-placer 122, and the pre-placer 122 may alternately place instances D31a to D34a and D36a to D39a of different dummy cells to be adjacent to an edge of the first instance D31a in a series of rows R32 to R35 where the first instance C31a is placed. For example, the instances D31a and D33a of a dummy cell having a left edge aligned in Y30 may be respectively placed in even rows R32 and R34, and the instances D32a and D34a of a dummy cell having a left edge aligned in Y31 may be respectively placed in odd rows R33 and R35. Similarly, the instances D36a and D38a of a dummy cell having a right edge aligned in Y32 may be respectively placed in odd rows R35 and R33, and the instances D37a and D39a of a dummy cell having a right edge aligned in Y33 may be respectively placed in even rows R34 and R32. Also, instances D30a and D35a of a dummy cell may be respectively placed in rows R31 and R36 adjacent to a series of rows R32 to R35 where the first instance C31a is placed.

As shown in FIG. 7, section (b), instances D31b to D34b and D36b to D39b of different dummy cells may be alternately placed adjacent to an edge of a first instance C31b in a series of rows R32 to R35 where the first instance C31b is placed. For example, an instance D32b of a dummy cell having a left edge aligned in Y34 may be placed in a row R33, instances D31b and D34b of a dummy cell having a left edge aligned in Y35 may be respectively placed in rows R32 and R35, and an instance D33b of a dummy cell having a left edge aligned in Y36 may be placed in a row R34. Similarly, an instance D38b of a dummy cell having a right edge aligned in Y37 may be placed in the row R33, instances D36b and D39b of a dummy cell having a right edge aligned in Y38 may be respectively placed in the rows R35 and R32, and an instance D37b of a dummy cell having a right edge aligned in Y39 may be placed in the row R34. Also, instances D30b and D35b of a dummy cell may be respectively placed in the rows R31 and R36 adjacent to the series of rows R32 to R35 where the first instance C31b is placed.

As shown in FIG. 8, section (a), a plurality of first instances C41a to C49a of a pre-placement cell may be aligned and placed in a series of rows R41 to R49 by the pre-placer 122, based on the design rule D320 of FIG. 4 for example. The pre-placer 122 may alternately place instances D41a to D49a and D41a' to D49a' of different dummy cells to be adjacent to edges of the first instances C41a to C49a aligned in the series of rows R41 to R49. For example, instances D42a, D44a, D46a, and D48a of a dummy cell having a left edge aligned in Y40 may be placed in even rows R42, R44, R46, and R48, and instances D41a, D43a, D45a, D47a, and D49a of a dummy cell having a left edge aligned in Y41 may be respectively placed in odd rows R41, R43, R45, R47, and R49. Similarly, instances D41a' to D49a' of a dummy cell having a right edge aligned in Y42 or Y43 may be alternately placed adjacent to right edges of the first instances C41a to C49a.

As shown in FIG. 8, section (b), the pre-placer 122 may alternately place instances D41b to D49b and D41b' to D49b' of different dummy cells to be adjacent to edges of first instances C41b to C49b aligned in the series of rows R41 to R49. For example, instances D43b, D46b, and D49b of a dummy cell having a left edge aligned in Y44 may be respectively placed in rows R43, R46, and R49, instances D42b, D45b, and D48b of a dummy cell having a left edge aligned in Y45 may be respectively placed in rows R42, R45, and R48, and instances D41b, D44b, and D47b of a dummy cell having a left edge aligned in Y46 may be respectively placed in rows R41, R44, and R47. Similarly, instances D41b' to D49b' of a dummy cell having a right edge aligned in Y47, Y48, or Y49 may be alternately placed adjacent to right edges of the first instances C41b to C49b.

Figure 9A:
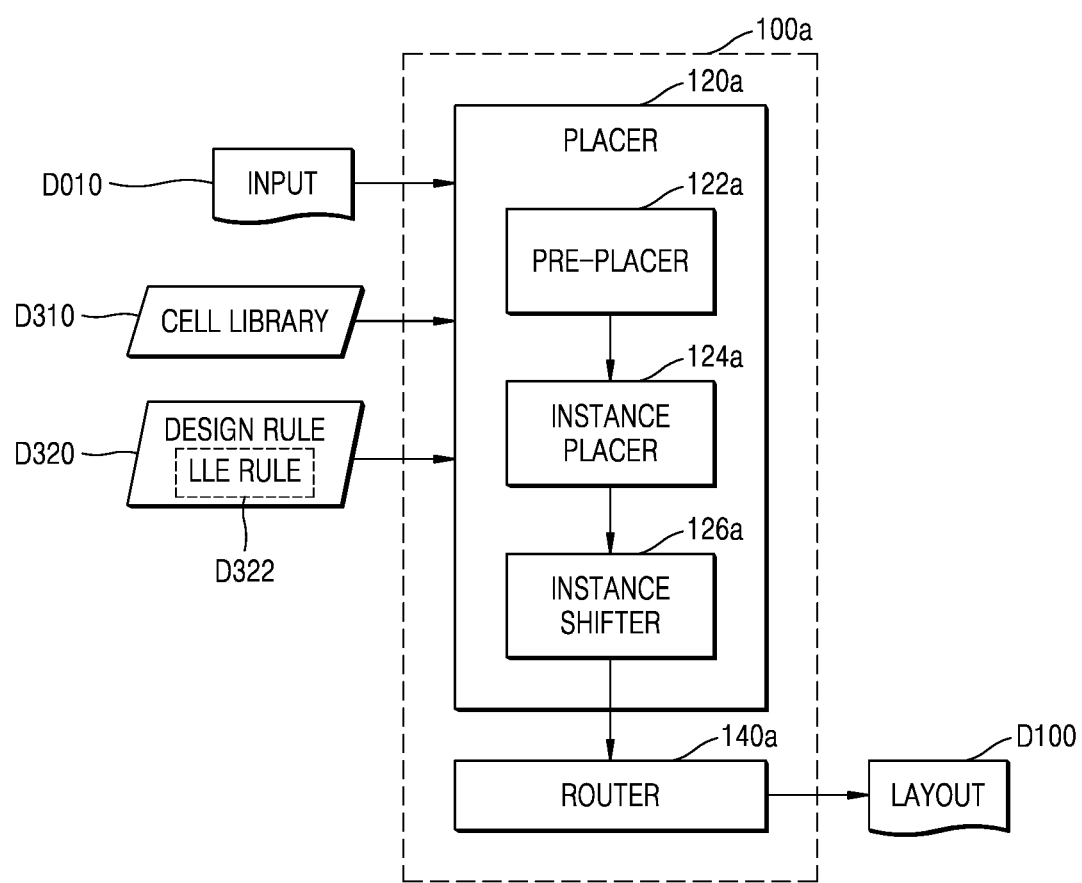
FIGS. 9A and 9B illustrate examples of an implementation group of FIG. 3.
Figure 9B:
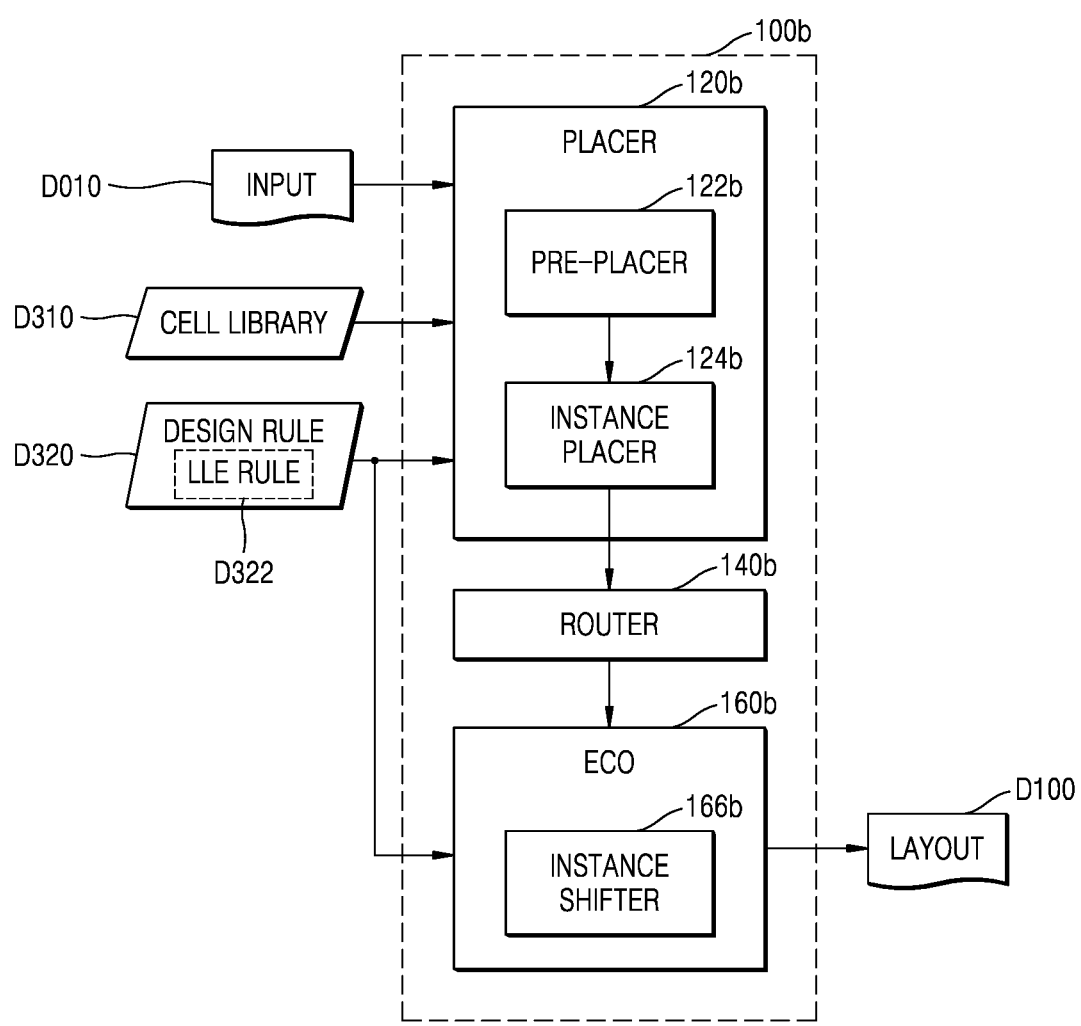

FIGS. 9A and 9B illustrate examples of the implementation group 100 of FIG. 3 according to an exemplary embodiment. As illustrated in FIGS. 9A and 9B, an implementation group 100a or 100b may include an instance shifter 126a or 166b.

According to an exemplary embodiment, as described below with reference to FIGS. 10A and 10B, the instance shifter 126a or 166a may shift at least one first or second instance associated with an LLE causing structure among first and second instances which are respectively placed by a pre-placer 122a and an instance placer 124a or 124b, thereby removing the LLE causing structure from a layout of an IC or decreasing an LLE based on the LLE causing structure. FIG. 9A illustrates an example where the instance shifter 126a is included in a placer 120a, and FIG. 9B illustrates an example where the instance shifter 166b is included in an engineering change order (ECO) 160b. According to an exemplary embodiment, the placer 120b of FIG. 9B may include an instance shifter similarly to the arrangement illustrated in FIG. 9A. In the following description that refers to FIGS. 9A and 9B, details which are the same as or similar to the details described above with reference to FIG. 4 are omitted.

As shown in FIG. 9A, the implementation group 100a may include a placer 120a and a router 140a. The placer 120a may include a pre-placer 122a, an instance placer 124a, and an instance shifter 126a. As described above with reference to FIG. 4, the pre-placer 122a may place instances (first instances) of a pre-placement cell, and the instance placer 124a may place instances (second instances) of a logic cell in an area where the first instances are not placed.

The instance shifter 126a may shift at least one first or second instance associated with an LLE causing structure among first and second instances, based on an LLE rule D322 included in a design rule D320. For example, the LLE rule D322 may include information defining at least one LLE causing structure, and the instance shifter 126a may detect an LLE causing structure from a layout of an IC including the first and second instances placed by the pre-placer 122a and the instance placer 124a, based on the LLE rule D322. The instance shifter 126a may shift at least one first or second instance associated with the detected LLE causing structure, thereby removing the LLE causing structure or decreasing an LLE based on the LLE causing structure.

The router 140a may generate interconnections which include the first or second instance shifted by the instance shifter 126a and connect the first and second instances of the IC, thereby generating layout data D100.

As shown in FIG. 9B, the implementation group 100b may include a placer 120b, a router 140b, and an ECO 160b. The ECO 160b may include an instance shifter 166b. The ECO 160b may denote a process of replacing a placed instance or adding a new instance depending on the case after instances of a standard cell are placed and interconnections connecting the instances are generated. The ECO 160b may locally perform a routing operation in association with the replaced or added instance. Therefore, processes (for example, logic combination, routing, timing analysis, etc.) of designing an IC are omitted, and moreover, restrictive changes may be reflected in the IC by the ECO 160b.

According to an exemplary embodiment, the instance shifter 166b may be included in the ECO 160b, and similarly to the instance shifter 126a of FIG. 9A, the instance shifter 166b may shift at least one first or second instance associated with the LLE causing structure, based on the LLE rule D322 included in the design rule D320. The instance shifter 166b may generate the layout data D100 of the IC including the shifted first or second instance.

Figure 10B:
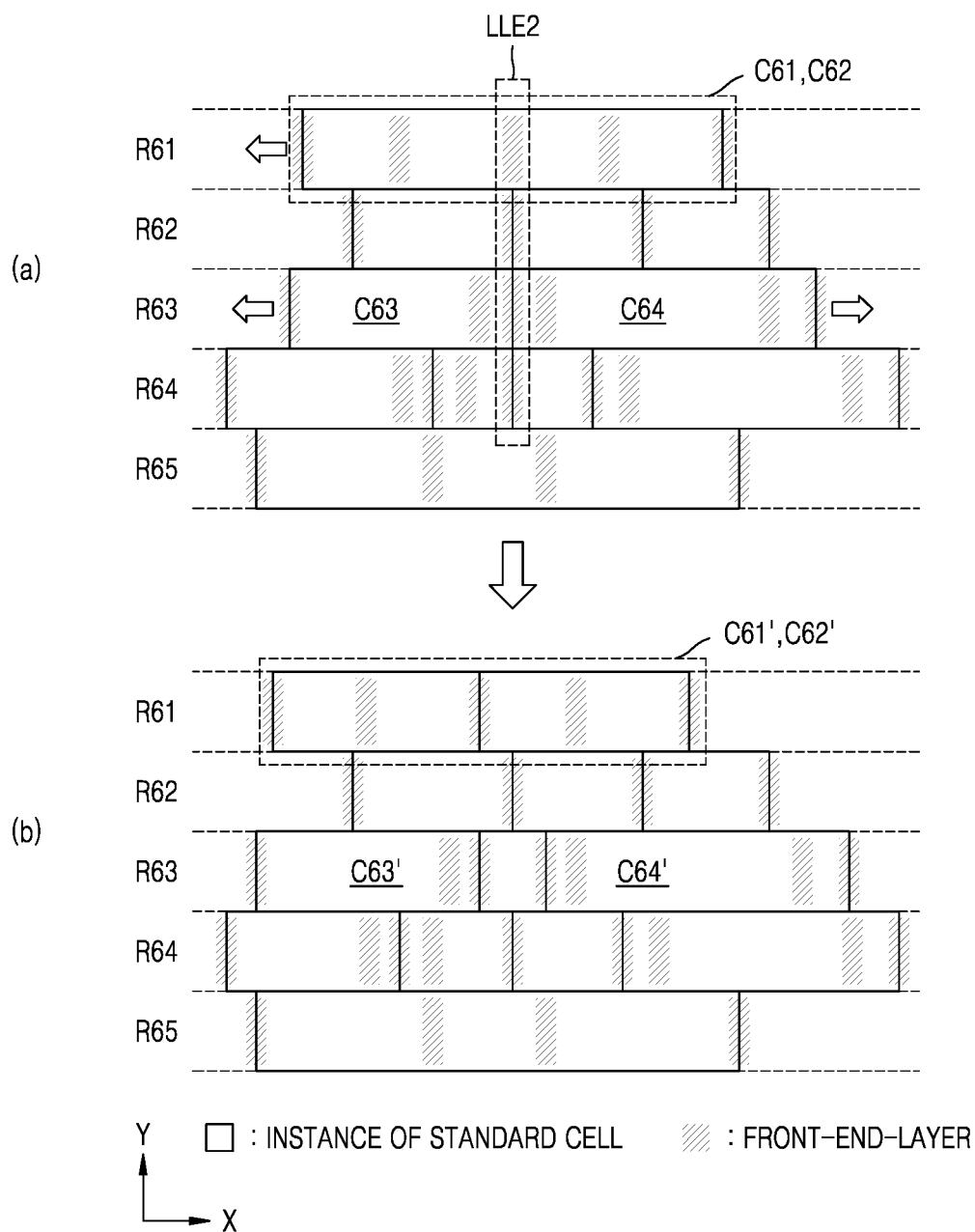

FIGS. 10A and 10B are diagrams illustrating exemplary operations of the instance shifter 126a or 166b of FIG. 9A or 9B according to exemplary embodiments. As described above with reference to FIGS. 9A and 9B, the instance shifter 126a or 166b may detect an LLE causing structure, based on the LLE rule D322 and may shift at least one first or second instance associated with the detected LLE causing structure, thereby removing the LLE causing structure or decreasing an LLE based on the LLE causing structure. FIGS. 10A and 10B illustrate examples where an instance is shifted by the instance shifter 126a or 166b, and it may be understood that an operation of the instance shifter 126a or 166b is not limited to the examples illustrated in FIGS. 10A and 10B. FIGS. 10A and 10B will be described with reference to FIG. 9A.

As shown in FIG. 10A, the instance shifter 126a may detect an LLE causing structure. For example, the LLE rule D322 of FIG. 9A may define patterns of a front-end-layer, which are aligned to have a certain length or more according to instances of a standard cell being placed, as an LLE causing structure, and as illustrated in FIG. 10A, section (a), the instance shifter 126a may detect patterns of a front-end-layer, which are aligned in a series of four rows R51 to R54, as an LLE causing structure LLE1. As illustrated in FIG. 10A, section (a), in order to remove the LLE causing structure LLE1, the instance shifter 126a may shift an instance C51 in a left direction (i.e., a −X direction) and may shift an instance C52 in a right direction (i.e., a +X direction). Also, in order to remove the LLE causing structure LLE1, the instance shifter 126a may shift at least one instance, including a pattern of a front-end-layer contributing to the LLE causing structure LLE1, in an up direction (i.e., a +Y direction) or a down direction (i.e., a −Y direction) as well as the left direction or the right direction, may shift and place the at least one instance to and in an area within or outside a certain distance, and may exchange a position with another instance. Therefore, as illustrated in FIG. 10A, section (b), the LLE causing structure LLE1 may be removed by instances C51' and C52' shifted by the instance shifter 126a.

As shown in FIG. 10B, according to an exemplary embodiment, the instance shifter 126a may shift two or more instances adjacent to each other in the same row. For example, as illustrated in FIG. 10B, section (a), in order to remove an LLE causing structure LLE2 including patterns of a front-end-layer which are aligned in a series of four rows R61 to R64, the instance shifter 126a may shift two or more instances C61 and C62, which are adjacent to each other in the row R61, in the same direction (i.e., a left direction or a −X direction). Also, the instance shifter 126a may shift two or more instances C63 and C64, which are adjacent to each other in the row R63, in opposite directions. Also, in order to remove the LLE causing structure LLE2, the instance shifter 126a may shift at least one instance, including a pattern of a front-end-layer contributing to the LLE causing structure LLE2, in an up direction (i.e., a +Y direction) or a down direction (i.e., a −Y direction) as well as the left direction or a right direction, may shift and place the at least one instance to and in an area within or outside a certain distance, and may exchange a position with another instance. Therefore, as illustrated in FIG. 10B, section (b), the LLE causing structure LLE2 may be removed by instances C61' and C62' shifted by the instance shifter 126a.

Hereinabove, the implementation group 100 of FIG. 3 according to an exemplary embodiment has been described with reference to FIGS. 4 to 10B. Hereinafter, the analysis group 200 of FIG. 3 will be described with reference to FIGS. 11 to 16.

Figure 11:
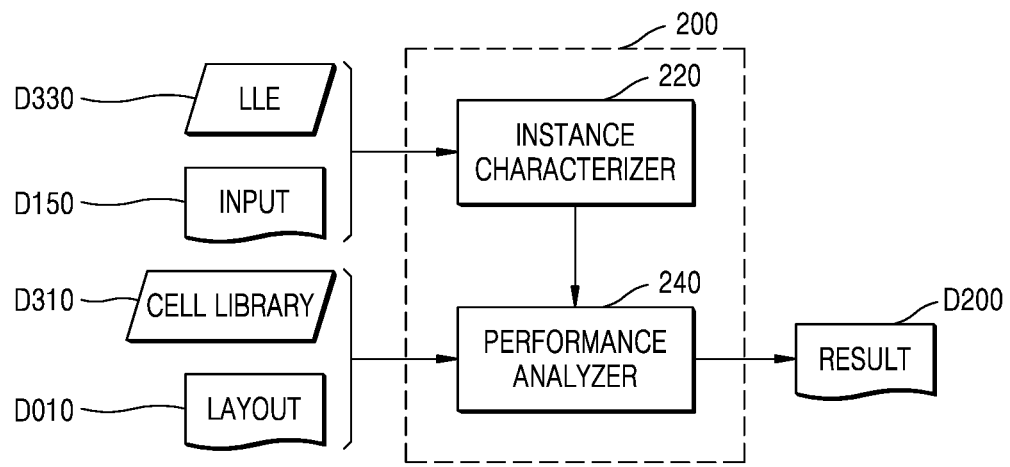
FIG. 11 illustrates a block diagram of an analysis group of FIG. 3 according to an exemplary embodiment.

FIG. 11 illustrates a block diagram of the analysis group 200 of FIG. 3 according to an exemplary embodiment. As described above, with reference to FIG. 3, the analysis group 200 may include an instance characterizer 220 and a performance analyzer 240 and may generate result data D200 from layout data D100, based on a cell library D310 and LLE data D330. The result data D200 generated by the analysis group 200 may include information about an actual performance of an IC in which an LLE is reflected.

As shown in FIG. 11, the instance characterizer 220 may access LLE data D330 and context data D150. The LLE data D330 may include information about a physical characteristic change of a standard cell caused by the LLE, and the context data D150 may include peripheral layout information about an instance extracted from the layout data D010. The instance characterizer 220 may calculate physical characteristics based on an LLE of instances included in the IC with reference to the LLE data D330 and the context data D150. Details of the LLE data D330 will be described below with reference to FIGS. 12 to 14, and details of the context data D150 will be described below with reference to FIGS. 15 and 16.

The performance analyzer 240 may access the cell library D310 and the layout data D010. The performance analyzer 240 may analyze a performance of the IC based on the layout data D010, based on information about a physical characteristic of the standard cell included in the cell library D310 and information about a physical characteristic of an instance provided by the instance characterizer 220 and may generate the result data D200 including actual performance information about the IC in which an LLE is reflected.

Figure 12:
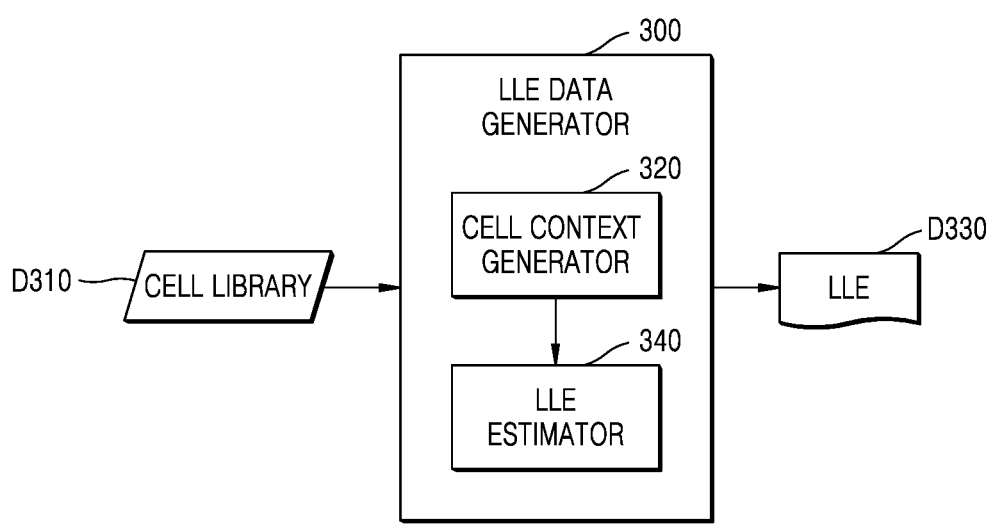
FIG. 12 illustrates a block diagram of an LLE data generator according to an exemplary embodiment.

FIG. 12 illustrates a block diagram of an LLE data generator 300 for generating LLE data D330, according to an exemplary embodiment. The LLE data generator 300 may include a procedure including a series of instructions, and an operation of the LLE data generator 300 may be performed by a processor (for example, the CPU 11 of FIG. 1) that executes the series of instructions. As illustrated in FIG. 12, the LLE data generator 300 may generate the LLE data D330 from the cell library D310 and may include a cell context generator 320 and an LLE estimator 340.

The cell context generator 320 may place various layouts near a layout of a standard cell included in the cell library D310, thereby generating a plurality of contexts of a first standard cell. For example, as described below with reference to FIG. 13A, the cell context generator 320 may place standard cells, including a pattern of a front-end-layer, near a target standard cell, thereby generating a context of the target standard cell. Also, as described below with reference to FIG. 13B, the cell context generator 320 may place arbitrary patterns, formed in a front-end-layer, near the standard cell, thereby generating a context of the standard cell. Various contexts of the standard cell generated by the cell context generator 320 may be used for the LLE estimator 340 to estimate an LLE corresponding to each of the contexts.

The LLE estimator 340 may be provided with information about the contexts of the standard cell from the cell context generator 320, may estimate an LLE occurring in each of the contexts, and may generate the LLE data D330 including information about a change in a physical characteristic of the standard cell based on the LLE. For example, the cell library D310 may include a characteristic function for calculating a value representing the physical characteristic of the standard cell, and the LLE estimator 340 may determine parameters of the characteristic function, based on the context provided from the cell context generator 320. The LLE estimator 340 may generate the LLE data D330 which includes the parameter determined by the LLE estimator 340 or a result of the characteristic function based on the determined parameter.

Figure 13A:
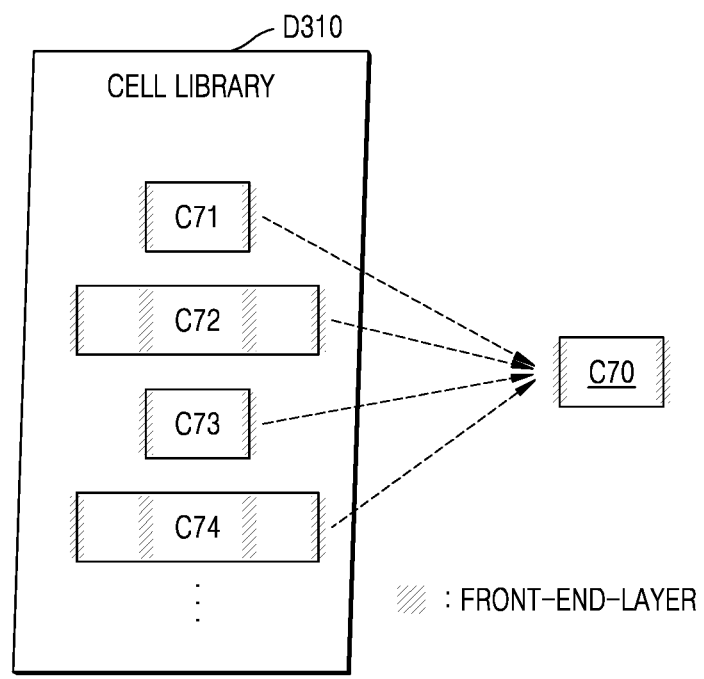
FIGS. 13A and 13B illustrate exemplary operations of generating, by a cell context generator of FIG. 12, a context of a standard cell according to exemplary embodiments.
Figure 13B:
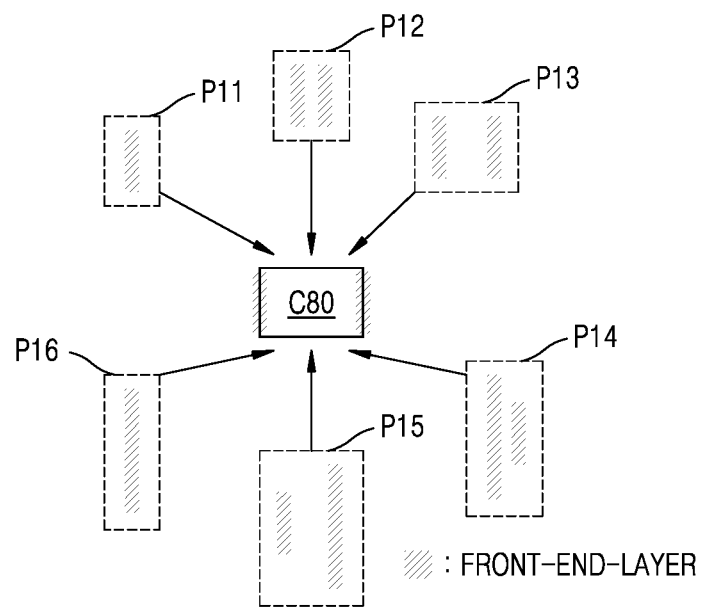

FIGS. 13A and 13B illustrate exemplary operations of generating, by the cell context generator 320 of FIG. 12, a context of a standard cell according to exemplary embodiments.

As shown in FIG. 13A, according to an exemplary embodiment, the cell context generator 320 may place standard cells C71 to C74, included in the cell library D310, near a standard cell C70 of which a context is to be generated, thereby generating various contexts of the standard cell C70. For example, the cell context generator 320 may generate a context of a target standard cell (for example, C70) including a pattern of a front-end-layer and may randomly place standard cells (for example, C71 to C74), including a pattern of a front-end-layer among standard cells defined in the cell library D310, near the target standard cell (for example, C70), thereby generating the context of the target standard cell.

As shown in FIG. 13B, according to an exemplary embodiment, the cell context generator 320 may place a polygon of a layer, having various shapes, near a standard cell C80, thereby generating a context of the standard cell C80. For example, as illustrated in FIG. 13B, the cell context generator 320 may randomly place a plurality of patterns P11 to P16, respectively including different patterns of a front-end-layer, near the standard cell C80, thereby generating contexts of the standard cell C80.

Figures 14, 15:
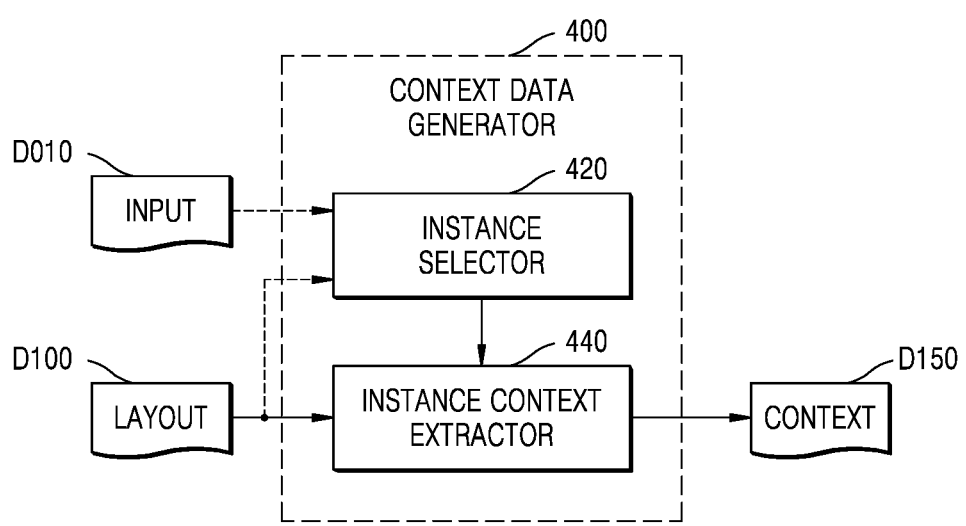
FIG. 14 illustrates an example of LLE data according to an exemplary embodiment.
FIG. 15 is a block diagram of a context data generator according to an exemplary embodiment.

FIG. 14 illustrates an example of LLE data D330 according to an exemplary embodiment. As described above with reference to FIG. 12, the LLE estimator 340 of the LLE data generator 300 may estimate an LLE corresponding to various contexts generated by the cell context generator 320, thereby generating the LLE data D330. FIG. 14 illustrates a portion of the LLE data D330 representing a change in a physical characteristic of an inverter INV which is a standard cell corresponding to an LLE.

According to an exemplary embodiment, the LLE estimator 340 may generate the LLE data D330, based on a context and parameters of a characteristic function determined based on the context. For example, the LLE estimator 340 may generate the LLE data D330 which includes the context and the parameters of the characteristic function determined based on the context, and may generate the LLE data D330 which includes the context and a value of a characteristic function corresponding to the context. Also, as illustrated in FIG. 14, the LLE estimator 340 may generate the LLE data D330 including a ratio or a difference between the value of the characteristic function corresponding to the context and a value of a characteristic function based on an intrinsic parameter of a standard cell, instead of the value of the characteristic function corresponding to the context. The intrinsic parameter of the standard cell may denote a parameter of a characteristic function for calculating a value representing an intrinsic physical characteristic of the standard cell like a case where an LLE does not occur in the standard cell or a case where an average LLE occurs in the standard cell.

As shown in FIG. 14, columns of a table may represent intervals between patterns of a front-end-layer in an X direction, and rows of the table may represent lengths of the patterns of the front-end-layer which are aligned in a Y direction. Based on a context of the inverter INV, if an interval between the patterns of the front-end-layer in the X direction is 2x (i.e., a distance corresponding to two times a reference distance) and a length of the patterns of the front-end-layer aligned in the Y direction is 1y (i.e., a length of a polygon drawn as a certain layer or one times a reference length), the physical characteristic of the inverter INV may be a value of a characteristic function based on an intrinsic parameter of the inverter INV.

As illustrated in FIG. 14, the table may include the changes in physical characteristic, respectively corresponding to various contexts of the inverter INV, as items, and for example, each of the items may correspond to a delay time of the inverter INV. For example, based on the context of the inverter INV, if an interval between the patterns of the front-end-layer in the X direction is 8x and a length of the patterns of the front-end-layer aligned in the Y direction is 5y, the delay time of the inverter INV may be further deteriorated by 7.37% (i.e., extension by 7.37%) than a delay time REF based on an intrinsic parameter, based on an LLE caused by the patterns of the front-end-layer. The delay time REF of the inverter INV based on the intrinsic parameter may be included in the cell library D310 or may be calculated from a characteristic function and an intrinsic parameter included in the cell library D310. As described above with reference to FIG. 11, the LLE data D330 including the table of FIG. 14 may be used for the instance characterizer 220 to characterize a layout of an IC.

FIG. 15 is a block diagram of a context data generator 400 according to an exemplary embodiment. The context data generator 400 may include a procedure including a series of instructions, and an operation of the context data generator 400 may be performed by a processor (for example, the CPU 11 of FIG. 1) that executes the series of instructions. In an embodiment, the context data generator 400 may be included in the implementation group 100 of FIG. 2, and thus, context data D150 may be generated along with layout data D100. Also, in an embodiment, the context data generator 400 may be included in the analysis group 200 of FIG. 3, and thus, the context data D150 may be generated from the layout data D100. As illustrated in FIG. 15, the context data generator 400 may include an instance selector 420 and an instance context extractor 440.

The instance selector 420 may select an instance, of which a context is to be generated, from a layout of an IC. For example, the instance selector 420 may provide all instances included in the IC to the instance context selector 440, or may select some instances from among the instances included in the IC to provide the selected instances to the instance context extractor 440. In an embodiment, the instance selector 420 may recognize instances included in a critical path of the IC, based on input data D010 or layout data D100, or may select the instances included in the critical path to provide the selected instances to the instance context extractor 440. Also, in an embodiment, the instance selector 420 may select instances included in a clock tree of the IC to provide the selected instances to the instance context extractor 440. The instance selector 420 may select instances, which are high in relation to a performance of the IC which is to be analyzed, among the instances included in the IC and may provide the selected instances to the instance context extractor 440.

The instance context extractor 440 may generate the context data D150, including information (i.e., a context) about peripheral layouts of the instances selected by the instance selector 420, from the layout data D100. For example, the instance context extractor 440 may generate the context data D150 including a context of an instance, based on a pattern of a front-end-layer included in the instance and a pattern of a front-end-layer included in a peripheral layout of the instance. The cell context generator 320 of FIG. 12 may place arbitrary various layouts near a standard cell so as to generate the LLE data D330, thereby generating various contexts of the standard cell. In order to generate the context data D150, the instance context extractor 440 of FIG. 15 may extract a context of an instance from an actual peripheral layout of an instance placed in a layout of the IC, based on the layout data D100.

Figure 16:
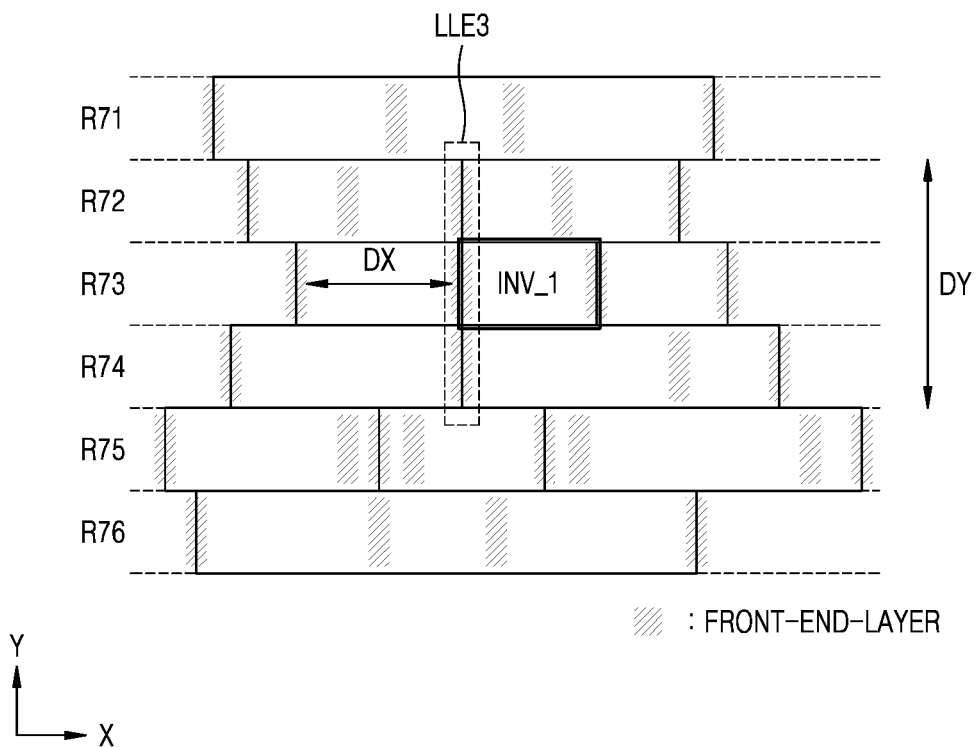
FIG. 16 illustrates an exemplary operation of an instance context extractor of FIG. 15.

FIG. 16 illustrates an exemplary operation of the instance context extractor 440 of FIG. 15. FIG. 16 is a plan view illustrating a portion of a layout of an IC, and the instance context extractor 440 may generate a context of an instance INV_1 of an inverter INV. That is, the instance INV_1 may be an instance selected by the instance selector 420 of FIG. 15 and may be provided to the instance context extractor 440.

As described above with reference to FIG. 15, the instance context extractor 440 may extract a context of an instance, based on a pattern of a front-end-layer included in the instance and a pattern of a front-end-layer included in a peripheral layout of the instance. For example, as illustrated in FIG. 15, the instance context extractor 440 may extract, as a context of the instance INV_1, a length DY of aligned patterns of a front-end-layer included in an LLE causing structure LLE3 related to the instance INV_1 and an X-direction distance DX between patterns of a front-end-layer adjacent to the aligned patterns. That is, in the embodiment of FIG. 15, the instance context extractor 440 may extract 3y and 8*x* as the context of the instance INV_1. Therefore, the instance characterizer 220 of FIG. 11 may deteriorate by 3.06% (i.e., extension by 3.06%) a delay time of the instance INV_1, based on LLE data D330 including the table of FIG. 14 and context data D150 including the context of the instance INV_1.

Figure 17:
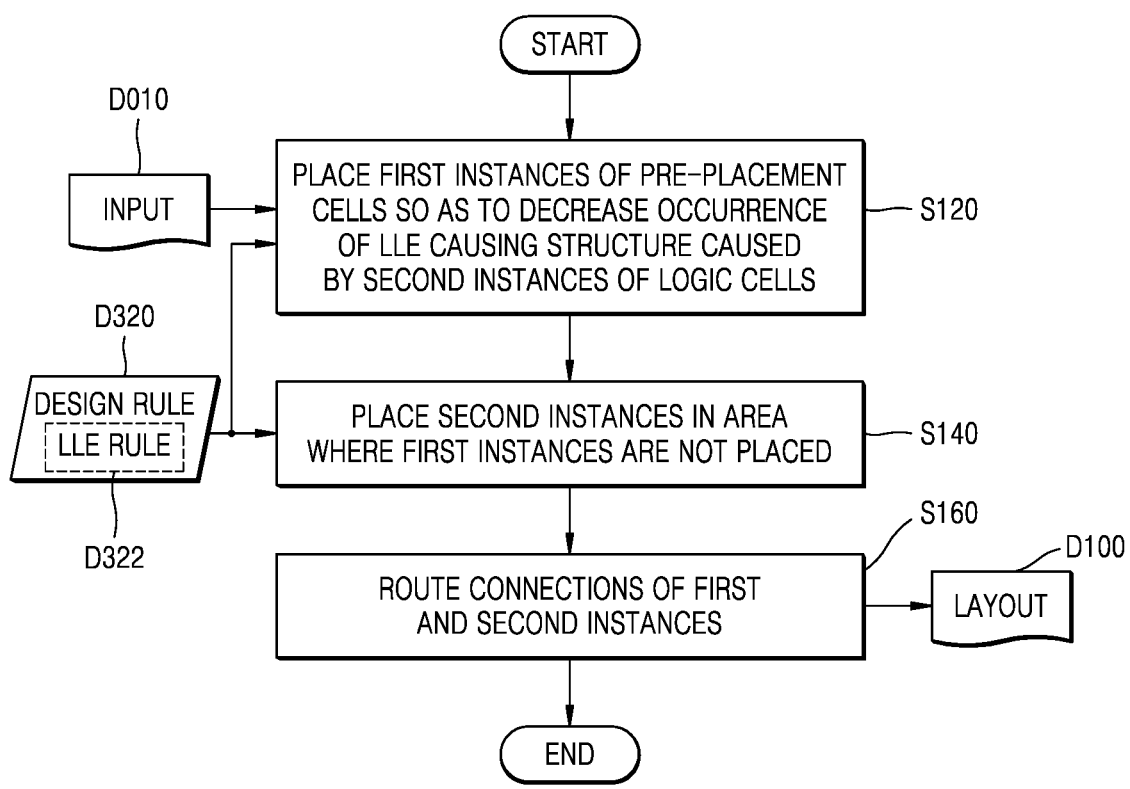
FIG. 17 is a flowchart illustrating an IC designing method according to an exemplary embodiment.

FIG. 17 is a flowchart illustrating an IC designing method according to an exemplary embodiment. In detail, FIG. 17 illustrates a method of generating a layout of an IC by considering an LLE, and the method illustrated in FIG. 17 may be performed by the implementation group 100 of FIG. 3. As illustrated in FIG. 17, the IC designing method may include operations S120, S140, and S160.

Operation S120 involves placing first instances of pre-placement cells so as to decrease occurrence of an LLE causing structure resulting from placement of second instances of logic cells. For example, the LLE causing structure may include patterns of a front-end-layer, and in order to decrease occurrence of the LLE causing structure caused by patterns of a front-end-layer included in the second instances, the first instances may be pre-placed. The first instances may be instances of a pre-placement cell and may be defined in input data D010 or may be added based on a design rule D320. Also, the LLE rule D322 included in the design rule D320 may include information about the LLE causing structure, and the first instances may be placed so as to decrease occurrence of the LLE causing structure, based on the LLE rule D322.

Operation S140 involves placing the second instances in an area where the first instances are not placed. The second instances may be instances of a logic cell and may start to be placed adjacent to the placed first instances so as to observe the design rule D320. Due to the placement of the first instances which occurred in operation S120, an occurrence of LLE causing structure resulting from placement of the second instances may be reduced.

Operation S160 involves routing connections of the first and second instances. For example, interconnections that connect the first and second instances may be generated, and layout data D100 which includes information about placement of the first and second instances and physical information about the interconnections may be generated.

Figure 18:
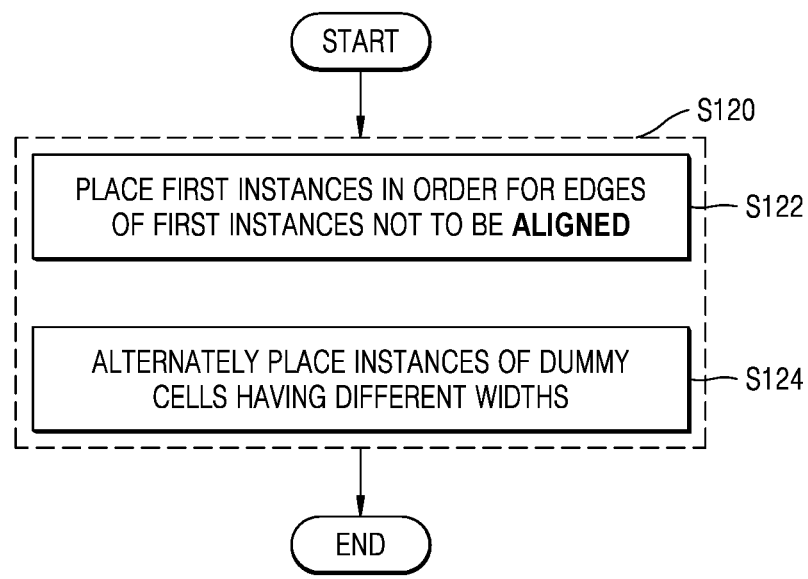
FIG. 18 is a flowchart illustrating an example of operation S120 of FIG. 17.

FIG. 18 is a flowchart illustrating an example of operation S120 of FIG. 17 according to an exemplary embodiment. As described above with reference to FIG. 17, operation S120 involves placing first instances of pre-placement cells so as to decrease occurrence of an LLE causing structure caused by placement of second instances of logic cells. In FIG. 18, operation S120 is illustrated as including two operations S122 and S124. However, operation S120 may include one of the two operations, or two operations S122 and S124 which may be performed in parallel or sequentially.

Operation S122 involves placing the first instances in order for edges of the first instances not to be aligned. For example, as described above with reference to FIGS. 5 and 6, the first instances may be placed so that edges of first instances closest to each other are not aligned. Accordingly, an LLE causing structure based on the second instances including a pattern of a front-end-layer formed in an edge is reduced.

Operation S124 involves alternately placing instances of dummy cells having different widths. For example, as described above with reference to FIG. 7, a pre-placement cell may include a multi-height cell placed in a series of rows, and an instance corresponding to the multi-height cell may include an edge vertical to the series of rows. Also, as described above with reference to FIG. 8, a plurality of instances of the pre-placement cell may be aligned and placed based on the design rule D320 and, thus, edges of first instances vertical to the series of rows may be provided. The instances of the dummy cells having different widths may be alternately placed adjacent to an edge of at least one first instance vertical to the series of rows, and thus, an LLE causing structure based on the second instances including a pattern of a front-end-layer formed in an edge is reduced.

Figure 19:
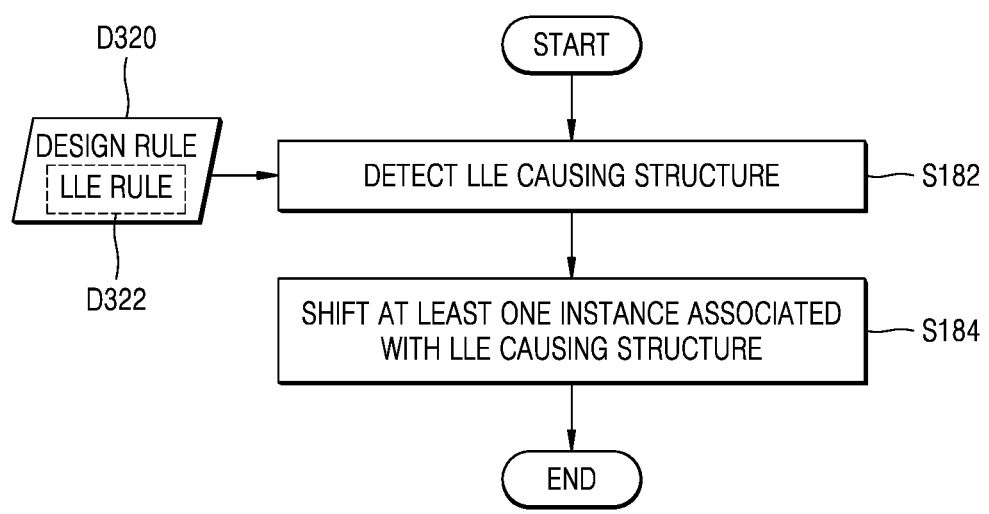
FIG. 19 is a flowchart illustrating a method of shifting an instance for removing an LLE causing structure, according to an exemplary embodiment.

FIG. 19 is a flowchart illustrating a method of shifting an instance for removing an LLE causing structure, according to an exemplary embodiment. According to an exemplary embodiment, operations S182 and S184 illustrated in FIG. 19 may be included in operation S140 of FIG. 17, or may be performed by, for example, an ECO after operation S160 of FIG. 17 is performed.

Operation S182 involves detecting an LLE causing structure. An LLE rule D322 included in a design rule D320 may include information about the LLE causing structure, and the LLE causing structure may be detected from instances (for example, the first and second instances placed in operations S120 and S140 of FIG. 17), based on the LLE rule D322. For example, the LLE rule D322 may define patterns of a front-end-layer, which are aligned to have a certain length or more, as an LLE causing structure, and the patterns of the front-end-layer which are aligned to have the certain length or more may be detected based on the LLE rule D322.

Operation S184 involves shifting at least one instance associated with the LLE causing structure. That is, in order to remove the detected LLE causing structure, at least one of instances (for example, the first and second instances of FIG. 17) associated with patterns of a front-end-layer included in the LLE causing structure may be shifted. For example, as illustrated in FIG. 10A, one instance may be shifted in one row, and as illustrated in FIG. 10B, two or more instances may be shifted in one row.

Figure 20:
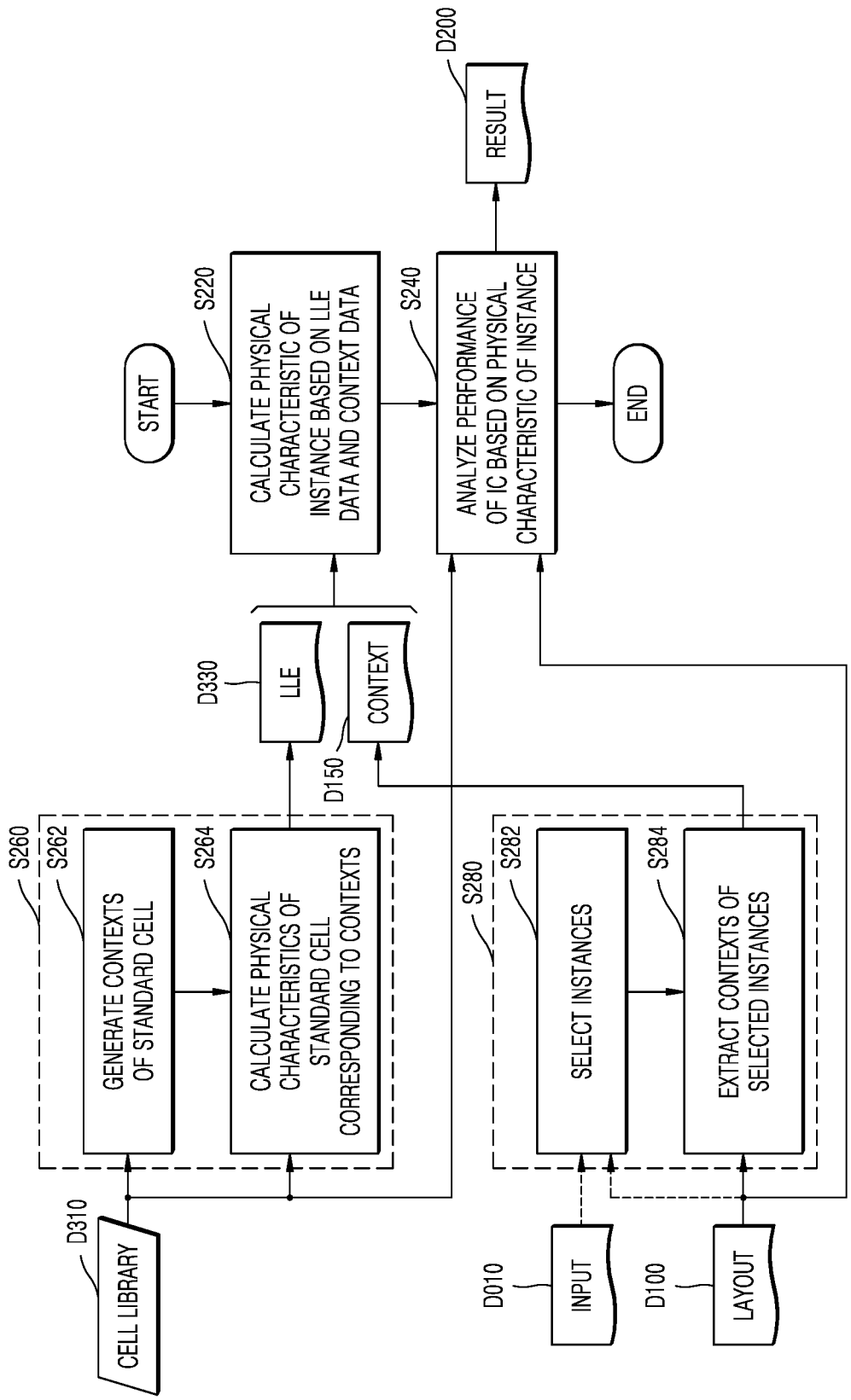
FIG. 20 is a flowchart illustrating an IC designing method according to an exemplary embodiment.

FIG. 20 is a flowchart illustrating an IC designing method according to an exemplary embodiment. In detail, FIG. 20 illustrates a method of analyzing a performance of an IC by considering an LLE, and the IC designing method may include operations S220, S240, S260, and S280.

Operation S220 involves calculating a physical characteristic of an instance based on LLE data D330 and context data D150. The physical characteristic of the instance may denote a physical characteristic which is changed or maintained from an intrinsic physical characteristic of a standard cell corresponding to the instance, based on an LLE caused by a peripheral layout (i.e., a context) of the instance. LLE data D330 may include information about the changes in a physical characteristic of a standard cell corresponding to various contexts, and context data D150 may include information about a context of an instance extracted from the layout data D100. As illustrated in FIG. 20, the LLE data D330 may be generated in operation S260, and the context data D150 may be generated in operation S280.

Operation S240 analyzes a performance of an IC based on the physical characteristic of the instance. For example, a netlist of the IC may be extracted from the layout data D100, based on a cell library D310 and the calculated physical characteristic of the instance, and the extracted netlist may include information about elements (for example, a resistor and/or a capacitor) for reflecting an actual operation based on the layout of the IC. A performance (for example, timing characteristic, power characteristic, noise characteristic, etc.) of the IC may be analyzed based on the extracted netlist, and result data D200 including information about the performance of the IC may be generated.

Operation S260 involves generating the LLE data D330 from the cell library D310. Operation S260 may be performed before operations S220 and S240 are performed, and may include operations S262 and S264.

Operation S262 involves generating a plurality of contexts of a standard cell. For example, as described above with reference to FIG. 13A, another standard cell (for example, the same or different standard cells) included in the cell library S310 may be variously placed near the standard cell, and thus, the plurality of contexts of the standard cell may be generated. Also, as described above with reference to FIG. 13B, patterns having various shapes formed in a front-end-layer may be placed near the standard cell, and thus, the plurality of contexts of the standard cell may be generated.

In operation S264, physical characteristics of the standard cell corresponding to the plurality of contexts may be calculated. For example, the cell library D310 may include a characteristic function of the standard cell, and parameters of the characteristic function respectively corresponding to the contexts may be determined. Accordingly, a plurality of physical characteristics based on a plurality of contexts may be calculated for one standard cell, and the LLE data D330 including information about the physical characteristics may be generated. For example, the LLE data D330 including a ratio or a difference between a value of a characteristic function corresponding to an intrinsic parameter of a standard cell and a value of a characteristic function corresponding to a parameter determined based on a context may be generated.

Operation S280 involves generating the context data D150 from the layout data D100. Operation S280 may be performed before operations S220 and S240 are performed, and may include operations S282 and S284.

Operation S282 involves selecting instances of which contexts are to be generated. All or some of the instances included in the IC may be selected based on the input data D010 or the layout data D100. For example, instances included in a critical path of the IC may be selected, or instances included in a clock tree may be selected.

Operation S284 involves extracting contexts of the selected instances. The context data D150 including information (i.e., a context) about a peripheral layout of each of the instances which have been selected in operation S282 may be generated from the layout data D100. For example, a context of a selected instance may be extracted based on a pattern of a front-end-layer included in the selected instance and a pattern of a front-end-layer included in a peripheral layout of the selected instance.

Figure 21:
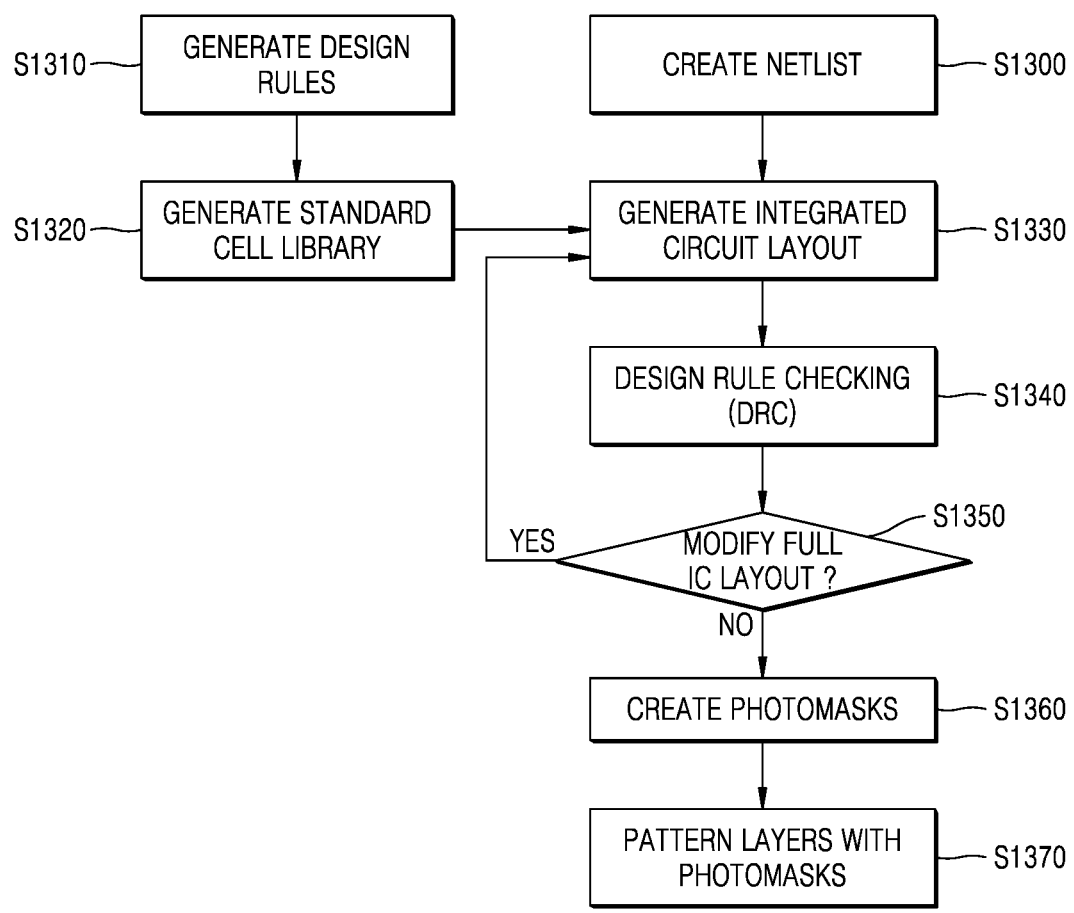
FIG. 21 is a flow chart illustrating the manufacturing process of an integrated circuit, including methods of designing according to FIGS. 17-20.

FIG. 21 is a flow chart illustrating the manufacturing process of an integrated circuit, including methods of designing according to FIGS. 17-20. As shown in FIG. 21, a netlist is generated in step S1300. The net list may comprise a gate level netlist and, as is known, may comprise a plurality of instances with gate level logic functions (e.g., NAND logic, NOR logic, inversion, etc.) and interconnections between these instances. The netlist may be generated by hardware description language (e.g., Verilog) provided by a circuit engineer.

In step S1310, a plurality of design rules are created. These design rules may be provided by process engineers that design various semiconductor processes to create various portions of an integrated circuit. For example, an engineer specializing in plasma processing used for etching, may provide design rule(s) designating a minimum via (or contact hole) size, whereas an engineer specializing in chemical mechanical polishing, may provide design rule(s) describing wiring densities which may require the use of dummy patterns in certain circumstances. Examples of design rules have been identified at D320 of FIG. 3 and the accompanying text.

In step S1320, a plurality of standard cell layouts is created to form a standard cell library. The standard cell layouts may comprise a layout design to implement a logic function of a corresponding instance of the netlist. A standard cell layout may describe a plurality of layers and their patterning that form the elements of the standard cell layout, such as one or more of wiring, vias, active regions of a semiconductor substrate, device isolation regions in a semiconductor substrate (e.g., to define the active regions), source/drain regions of transistors, channel regions of transistors, gate regions of transistors, etc. Some of the standard cells layouts may be designed to conform with (not violate) the plurality of design rules. Other of the standard cell layouts may be designed so that a first layout region may violate one or more of the plurality of design rules and another region does not violate the one or more design rules. The first layout region may be separately designed and correspond to a graphical representation of a portion of the standard cell layout. The first layout region may be fixed so that the representation of this region does not vary (e.g., in size, relative location and location of its elements) whereas the other region may be allowed to vary. Further exemplary detail of the standard cell layouts have been previously described herein in further detail, e.g., with respect to FIGS. 2-16. For example, some of the standard cell layouts may correspond to the standard cells previously discussed above.

In step S1330, an integrated circuit layout is generated, such as the layout for the entire integrated circuit. The integrated circuit layout may be generated by a place and routing function, using the gate level netlist and the standard cell layouts of the standard cell library. Standard cells layouts may correspond to instances of the netlist so that logical functions of an instance of the netlist may be implemented by the layout structure of the corresponding standard cell layout.

In step S1340, design rule checking may be performed on the integrated circuit layout to determine if it violates any of the design rules. Portions of the layout that correspond to the first layout region (or similar regions) may be identified and design rule violations corresponding to these portions may be ignored or may not be tested for design rule violations. If there are design rule violations in other portions not identified so, the layout may be modified (step S1350) and tested again at step S1340 until it passes this design rule checking step.

In step S1360, photomasks may be created based upon the integrated circuit layout. In step S1370, a plurality of layers may be formed on a semiconductor substrate. The plurality of layers may be patterned using the photomasks created in step S1350. The patterned layers may correspond to the integrated circuit layout and portions of these patterned layers may correspond to standard cells of the standard cell library. The thus formed integrated circuit may be packaged in a semiconductor package and used in various manners in systems according to its intended use.

While the inventive concept has been particularly shown and described with reference to exemplary embodiments thereof, it will be understood that various changes in form and details may be made therein without departing from the spirit and scope of the following claims.

What is claimed is:

1. A system for designing an integrated circuit (IC) including instances of standard cells, the system comprising:

a memory configured to store information including procedures; and a processor configured to access the memory and execute the procedures, wherein the procedures comprise:

a pre-placer configured to place first instances of pre-placement cells to decrease occurrence of a local layout effect (LLE) causing structure caused by aligned patterns of second instances of logic cells when the second instances are placed adjacently;

an instance placer configured to place the second instances adjacently in an area where the first instances are not placed by the pre-placer; and a router configured to generate layout data of the IC by routing connections of the placed first and second instances.

2. The system of claim 1, wherein the pre-placement cells comprise at least one of a well-edge cell, a well-bias cell, and a decap cell.

3. The system of claim 1, wherein the LLE causing structure comprises patterns of a front-end-layer included in two or more second instances adjacent to each other.

4. The system of claim 3, wherein
the first and second instances are placed in a plurality of rows which are arranged in parallel at equal intervals, and
the pre-placer places the first instances so that patterns of a front-end-layer included in the second instances are not aligned in a direction vertical to the plurality of rows.

5. The system of claim 4, wherein the pre-placer places the first instances so that edges of first instances closest to each other are not aligned in a direction vertical to the plurality of rows.

6. The system of claim 4, wherein
the first instances comprise at least one first instance configuring an edge vertical to a series of rows among the plurality of rows, and
the pre-placer alternately places instances of two or more dummy cells having different widths to be adjacent to the edge vertical to the series of rows.

7. The system of claim 6, wherein the edge vertical to the series of rows is configured by a first instance of a pre-placement cell, which is a multi-height cell, or two or more adjacent first instances which are aligned in a direction vertical to the series of rows.

8. The system of claim 1, wherein the procedures each comprise an instance shifter configured to detect the LLE causing structure from a layout, where the first and second instances are placed, and shift at least one first or one second instance associated with the LLE causing structure among the first and second instances, thereby removing the LLE causing structure.

9. A method of manufacturing an integrated circuit (IC) including instances of standard cells, the method comprising:

placing first instances of pre-placement cells to decrease occurrence of LLE causing structure resulting from aligned patterns of second instances of logic cells when the second instances are placed adjacently, wherein the first instances are defined in input data or are added based on a design rule;

placing the second instances adjacently in an area where first instances are not placed after the first instances are placed, wherein the second instances are instances of a logic cell and are initially placed adjacent to the placed first instances so as to observe a design rule; and providing routing connections between said first and second instances to generate a layout of the IC.

10. The method of claim 9, wherein said placing first instances comprises placing first instances in order for edges of first instances not to be aligned, and alternately placing instances of dummy cells having different widths.

11. The method of claim 10, wherein said placing second instances comprises detecting an LLE causing structure included in a design rule and shifting at least one instance associated with the LLE causing structure.

12. The method of claim 9, further comprising:
creating a plurality of photolithographic masks using the layout of the IC; and
creating a final IC layout by patterning layers formed on a substrate using the plurality of photolithographic masks.

13. A method of manufacturing an integrated circuit (IC) including instances of standard cells, the method comprising:

obtaining a netlist and a standard cell library;
the netlist comprising a plurality of instances, their functions and interconnections between the instances;
the standard cell library comprising standard cells including preplacement cells corresponding to first instances, and logic cells corresponding to second instances;
using one or more design rules performing at least one of:
(a) placing the second instances adjacently in an area where the first instances are not placed after placing the first instances to reduce effects of a local layout effect (LLE) causing structure caused by aligned patterns of the second instances when the second instances are placed adjacently, and generating layout data of the IC by routing connections of the first and second instances; and (b) using an instance characterizer configured to obtain LLE data including information about a physical characteristic of a standard cell dependent on a peripheral layout, calculating a physical characteristic of an instance placed in the IC based on context data including a context of the placed instance, and a peripheral layout of the placed instance, and using a performance analyzer configured to generate result data including performance information about the IC, based on the calculated physical characteristic of the placed instance;
creating a layout of the IC using the netlist, the standard cell library and said one or more design rules;
conducting design rule checking;
determining whether to modify said layout of the IC based on said design rule checking;
wherein if it is determined that said layout of the IC should be modified, generating a modified IC layout and conducting design rule checking for said modified IC layout and repeating the previous two elements until it is determined that no further modifications are needed;
creating a plurality of photolithographic masks using the IC layout that required no further modification; and
creating a final IC layout by patterning layers formed on a substrate using the plurality of photolithographic masks.

14. The method of claim 13, wherein said one or more design rules further comprises accessing LLE data including information about a physical characteristic of a standard cell dependent on a peripheral layout, accessing context data including a context of a placed instance, of a peripheral layout of an instance placed in the IC, and calculating a physical characteristic of the placed instance, based on the LLE data and the context data, and generating result data including performance information about the IC based on the calculated physical characteristic of the placed instance.

15. The method of claim 14, wherein said one or more design rules further comprises placing instances of dummy cells adjacent to first instances to decrease occurrence of an LLE causing structure based on placement of second instances.

16. The method of claim 13, wherein said one or more design rules further comprises placing instances of dummy cells adjacent to first instances to decrease occurrence of an LLE causing structure based on placement of second instances.

* * * * *